US011993311B2

(12) United States Patent
Higai et al.

(10) Patent No.: US 11,993,311 B2
(45) Date of Patent: May 28, 2024

(54) AUTOMOTIVE CRASHWORTHINESS ENERGY ABSORPTIVE PART AND METHOD FOR MANUFACTURING SAME

(71) Applicant: JFE Steel Corporation, Tokyo (JP)

(72) Inventors: Kazuhiko Higai, Tokyo (JP); Tsuyoshi Shiozaki, Tokyo (JP); Yoshikiyo Tamai, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 437 days.

(21) Appl. No.: 17/299,488

(22) PCT Filed: Sep. 6, 2019

(86) PCT No.: PCT/JP2019/035182
§ 371 (c)(1),
(2) Date: Jun. 3, 2021

(87) PCT Pub. No.: WO2020/129327
PCT Pub. Date: Jun. 25, 2020

(65) Prior Publication Data

US 2022/0081033 A1 Mar. 17, 2022

(30) Foreign Application Priority Data

Dec. 20, 2018 (JP) ................................ 2018-238021

(51) Int. Cl.
*F16F 7/12* (2006.01)
*B60R 19/18* (2006.01)
(Continued)

(52) U.S. Cl.
CPC .............. *B62D 21/15* (2013.01); *B60R 19/18* (2013.01); *B60R 19/34* (2013.01); *B62D 21/152* (2013.01);
(Continued)

(58) Field of Classification Search
CPC .. F16F 7/12; F16F 7/124; B62D 21/15; B62D 21/152; B62D 19/18; B62D 19/34;
(Continued)

(56) References Cited

U.S. PATENT DOCUMENTS 5,575,526 A * 11/1996 Wycech ............... B62D 29/002 296/187.02
5,884,960 A * 3/1999 Wycech ............... B62D 29/001 296/146.6

(Continued)

FOREIGN PATENT DOCUMENTS

CN 1235106 A 11/1999
CN 105835952 A 8/2016

(Continued)

OTHER PUBLICATIONS

Hasegawa, K. et al., "Cold-rolled and Galvannealed (GA) High Strength Steel Sheets for Automotive Cabin Structure," (Aug. 2012), pp. 6-12, JFE Technical Report No. 30, with English abstract only.

(Continued)

*Primary Examiner* — Thomas J Williams
(74) *Attorney, Agent, or Firm* — Buchanan Ingersoll & Rooney PC

(57) ABSTRACT

An automotive crashworthiness energy absorptive part to be provided at a front portion or a rear portion of an automotive body, the automotive crashworthiness energy absorptive part including: a tubular member configured to be axially crushed to absorb crashworthiness energy, the tubular member having a top portion and side wall portions continuous to the top portion; and a resin configured to coat or patch at least inner surfaces of the top portion and the side wall portions of the tubular member, wherein the coated or patched resin has a thickness of 8 mm or less after being heated and forms at least a part of a peripheral wall portion
(Continued)

in a closed cross-sectional space, and adheres to the inner surfaces with an adhesive strength of 10 MPa or more.

5 Claims, 11 Drawing Sheets

(51) Int. Cl.
*B60R 19/34* (2006.01)
*B62D 21/15* (2006.01)
*B62D 29/00* (2006.01)

(52) U.S. Cl.
CPC .............. *B62D 29/005* (2013.01); *F16F 7/12* (2013.01); *B60Y 2306/01* (2013.01)

(58) Field of Classification Search
CPC .... B62D 29/005; B62D 29/002; B62D 25/08; B29C 65/02; B29C 65/48; B60Y 2306/01; B60Y 2304/03; B60Y 2306/09
USPC .................................................. 188/376, 377
See application file for complete search history.

(56) References Cited

U.S. PATENT DOCUMENTS

| | | | | |
|---|---|---|---|---|
| 6,096,403 | A * | 8/2000 | Wycech | B29C 44/1228 428/35.8 |
| 6,199,941 | B1 | 3/2001 | Takahara et al. | |
| 6,293,614 | B1 | 9/2001 | Takahara et al. | |
| 6,474,726 | B1 * | 11/2002 | Hanakawa | B62D 25/04 296/203.03 |
| 2022/0081033 | A1 * | 3/2022 | Higai | B60R 19/18 |
| 2022/0081038 | A1 * | 3/2022 | Higai | B62D 29/005 |
| 2022/0219631 | A1 * | 7/2022 | Higai | B60R 19/18 |

FOREIGN PATENT DOCUMENTS

| | | | | |
|---|---|---|---|---|
| CN | 108263479 A | | 7/2018 | |
| JP | 2000318075 A | | 11/2000 | |
| JP | 2001048054 A | | 2/2001 | |
| JP | 2003226261 A | | 8/2003 | |
| JP | 2006240134 A | | 9/2006 | |
| JP | 2018144529 A | | 9/2018 | |
| WO | WO-2014136733 A1 | * | 9/2014 | B62D 21/15 |
| WO | WO-2015080129 A1 | * | 6/2015 | B60R 19/18 |

OTHER PUBLICATIONS

Extended European Search Report for European Application No. 19 899 986.4, dated Jan. 19, 2022, 8 pages.
International Search Report and Written Opinion for International Application No. PCT/JP2019/035182, dated Nov. 12, 2019, 5 pages.
Korean Office Action for Korean Application No. 10-2021-7017820, dated Sep. 25, 2022, with Concise Statement of Relevance of Office Action, 13 pages.
Chinese Office Action with Search Report for Chinese Application No. 201980083276.1, dated Oct. 10, 2022, 7 pages.

* cited by examiner

AUTOMOTIVE CRASHWORTHINESS ENERGY ABSORPTIVE PART AND METHOD FOR MANUFACTURING SAME

CROSS REFERENCE TO RELATED APPLICATIONS

This is the U.S. National Phase application of PCT/JP2019/035182, filed Sep. 6, 2019, which claims priority to Japanese Patent Application No. 2018-238021, filed Dec. 20, 2018, the disclosures of these applications being incorporated herein by reference in their entireties for all purposes.

FIELD OF THE INVENTION

The present invention relates to an automotive crashworthiness energy absorptive part and a method for manufacturing the same, and more particularly, to an automotive crashworthiness energy absorptive part configured to be axially crushed when crashworthiness load is input from a front side or a rear side of an automotive body to absorb crashworthiness energy, and a method for manufacturing the same.

BACKGROUND OF THE INVENTION

There are many technologies to improve automotive crashworthiness energy absorptive properties, such as optimization of shape, structure, and material of automotive parts. Furthermore, in recent years, many technologies have been proposed to improve the crashworthiness energy absorptive properties of an automotive part and reduce the weight of automotive body by foaming and filling a resin (such as foamed resin) inside the automotive part with a closed cross section shape.

For example, Patent Literature 1 discloses the following technology of automotive structural parts. A closed space is formed inside automotive structural parts by aligning the directions of the top portions of hat-shaped cross section parts such as side sills, floor members, and pillars and overlapping the flanges. The structural parts are filled with a foam filler to improve the bending strength and torsional stiffness of the automotive structural parts with a minimum weight increase. This technology improves the rigidity and collision safety of the automotive body.

Furthermore, Patent Literature 2 discloses a technology for filling the internal space of a closed cross section shape such as a pillar with hat-shaped cross section parts facing each other and flanges together with a high-rigidity foam, in which the high-rigidity foam is fixed by compressive counterforce caused by filling and foaming. This technology improves the vibration isolating performance to suppress the transmission of vibration sound, as well as to improve the strength, rigidity, and impact energy absorption.

PATENT LITERATURE

Patent Literature 1: Japanese Patent Application Laid-open No. 2006-240134

Patent Literature 2: Japanese Patent Application Laid-open No. 2000-318075

SUMMARY OF THE INVENTION

According to the technologies disclosed in Patent Literature 1 and Patent Literate 2, by filling the interior of an automotive part with a foam filler or foam, it is possible to improve the strength of the automotive part against bending deformation, impact energy absorption, and rigidity against torsional deformation, and the deformation of the automotive part can be suppressed.

However, for automotive parts such as front side members and crash boxes, which absorb crashworthiness energy by buckling deformation in a bellows-shaped manner when crashworthiness loads are input from the front or rear of the automotive body and cause axial crushing, there is a problem in that even if the technology to fill the interior of the automotive part with a foam filler or foam is applied, it is difficult to improve the crashworthiness energy absorptive properties.

Aspects of the present invention have been made in order to solve the above-mentioned problem, and it is an object thereof to provide an automotive crashworthiness energy absorptive part, which can improve crashworthiness energy absorptive effect by coating the inner surface with a resin and function as a damping material for absorbing vibration occurring in an automotive body, when crashworthiness load is input from the front side or the rear side of the automotive body such as a front side member or a crash box and causes axial crush, and a method for manufacturing the same.

To solve the problem and achieve the object, an automotive crashworthiness energy absorptive part according to aspects of the present invention to be provided at a front portion or a rear portion of an automotive body and configured to be axially crushed when crashworthiness load is input from a front side or a rear side of the automotive body to absorb crashworthiness energy, the automotive crashworthiness energy absorptive part includes: a tubular member configured to be axially crushed to absorb crashworthiness energy, the tubular member having a top portion and side wall portions continuous to the top portion; and a resin configured to coat or patch at least inner surfaces of the top portion and the side wall portions of the tubular member, wherein the coated or patched resin has a thickness of 8 mm or less after being heated and forms at least a part of a peripheral wall portion in a closed cross-sectional space, and adheres to the inner surfaces with an adhesive strength of 10 MPa or more.

Moreover, the automotive crashworthiness energy absorptive part according to aspects of the present invention further includes a release prevention member configured to cover a surface of the resin and join to the inner surface of the side wall portions, in order to prevent the resin from being released from the inner surface, wherein the resin adheres to the release prevention member with an adhesive strength of 10 MPa or more.

Moreover, a method for manufacturing an automotive crashworthiness energy absorptive part according to aspects of the present invention to be provided at a front portion or a rear portion of an automotive body and configured to be axially crushed when crashworthiness load is input from a front side or a rear side of the automotive body to absorb crashworthiness energy, the automotive crashworthiness energy absorptive part including a tubular member having a top portion and side wall portions continuous to the top portion, the method includes: a step of coating or patching an inner surface of the tubular member with a resin with a thickness of 8 mm or less; and a step of adhering the resin to the inner surface of the tubular member with an adhesive strength of 10 MPa or more by performing heat treatment, under a predetermined condition, on the tubular member coated or patched with the resin.

Moreover, a method for manufacturing the automotive crashworthiness energy absorptive part according to aspects of the present invention includes: a step of coating or patching the inner surface of the tubular member with a resin with a thickness of 8 mm or less; a step of joining, to the inner surface of the side wall portions, the release prevention member for preventing the resin that is coating or patching the inner surface from being released from the inner surface, by disposing the release prevention member so as to cover the surface of the resin; and a step of adhering the resin to the inner surface of the tubular member and to the release prevention member, with an adhesive strength of 10 MPa or more by performing heat treatment, under a predetermined condition, on the tubular member coated or patched with the resin.

Moreover, a method for manufacturing the automotive crashworthiness energy absorptive part according to aspects of the present invention includes: a step of coating or patching a release prevention member with a resin with a thickness of 8 mm or less, the release prevention member being configured to prevent the resin from being released from the inner surfaces of the top portion of the tubular member and the side wall portions continuous to the top portion; a step of joining the release prevention member to the inner surface of the side wall portions by disposing the resin that is coating or patching the release prevention member such that the resin contacts the inner surface of the tubular member; and a step of adhering the resin to the inner surface and to the release prevention member, with an adhesive strength of 10 MPa or more by performing heat treatment, under a predetermined condition, on the tubular member having the inner surface to which the release prevention member is joined.

According to aspects of the present invention, in the process of compressive deformation of a tubular member that absorbs crashworthiness energy by axially crushing when crashworthiness load is input from the front or rear of the automotive body, the buckling strength of the tubular member can be increased and buckling deformation can be generated in a bellows shape without reducing the deformation resistance of the tubular member, and a fracture in a bending portion of the buckling deformation of the tubular member can be prevented, thus improving crashworthiness energy absorptive properties. Furthermore, according to aspects of the present invention, vibrations from the automotive engine and vibrations input to the automotive body from various directions during driving a car can be absorbed, thereby improving vibration-damping properties.

DETAILED DESCRIPTION OF EMBODIMENTS OF THE INVENTION

Automotive crashworthiness energy absorptive parts and methods for manufacturing the same according to first and second embodiments of the present invention are described below with reference to FIG. 1 to FIG. 8. Note that, in the present specification and the drawings, elements having substantially the same functions and configurations are denoted by the same reference symbols to omit overlapping descriptions.

First Embodiment

<Automotive Crashworthiness Energy Absorptive Part>

Figure 1:
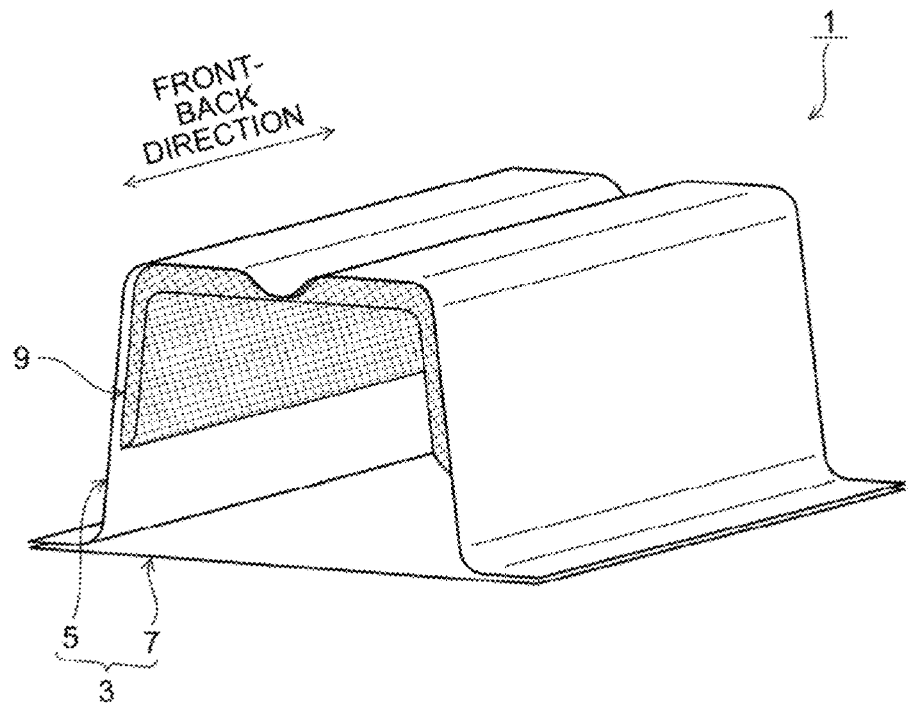
FIG. 1 is a perspective view illustrating an automotive crashworthiness energy absorptive part according to a first embodiment of the present invention.
Figure 2:
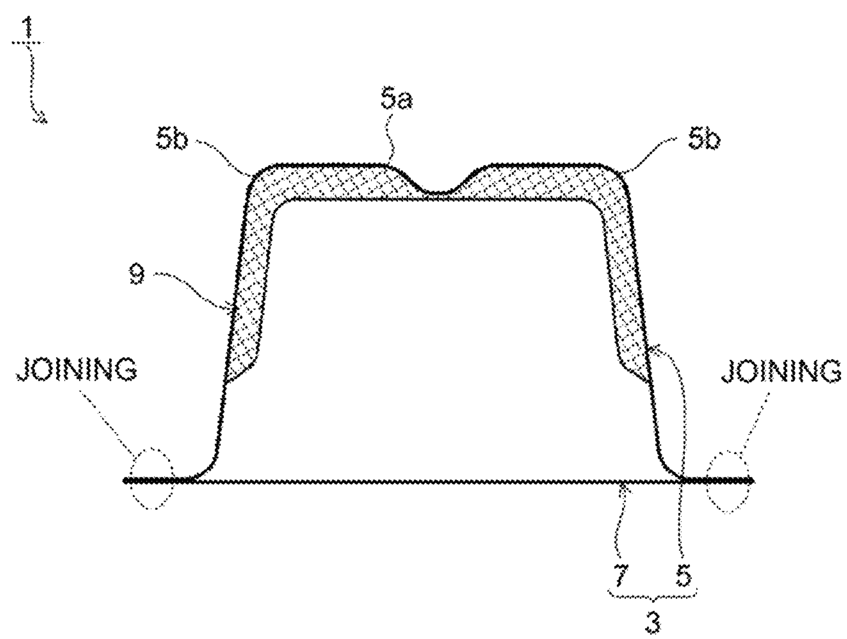
FIG. 2 is a cross-sectional view illustrating the automotive crashworthiness energy absorptive part according to the first embodiment of the present invention.
Figure 3:
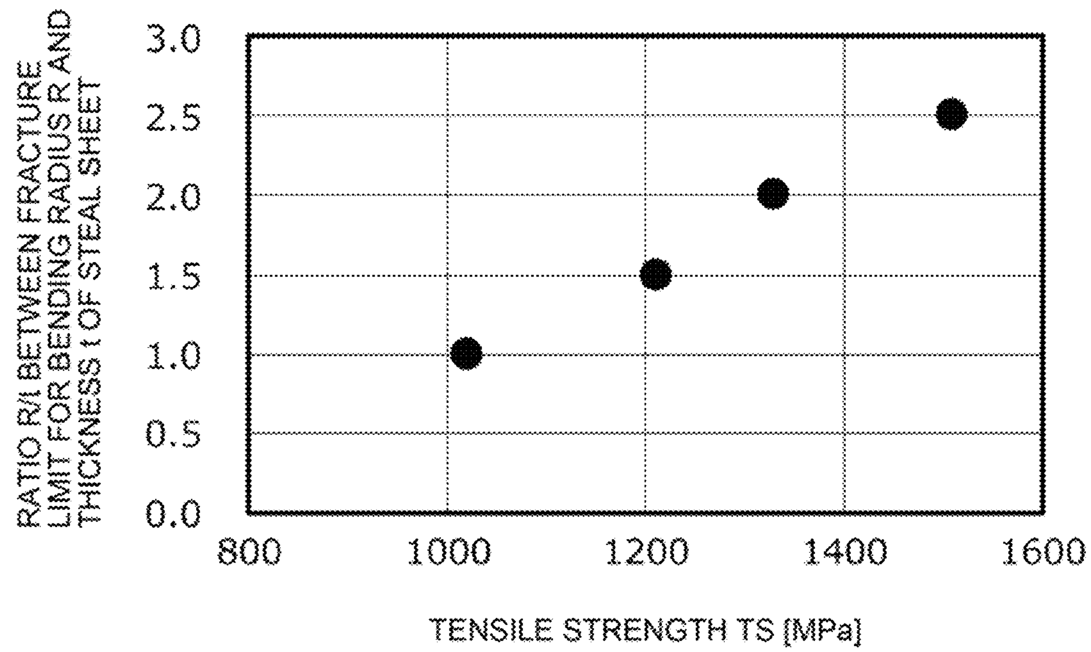
FIG. 3 is a graph illustrating a relation between steel sheet strength level and a fracture limit for bending radius of steel sheet.

As exemplified in FIG. 1 and FIG. 2, an automotive crashworthiness energy absorptive part 1 according to the first embodiment of the present invention includes: a tubular member 3 provided at a front portion or a rear portion of an automotive body, configured to be axially crushed in a longitudinal direction of the tubular member 3 when crashworthiness load is input from the front side or the rear side of the automotive body to absorb crashworthiness energy, in which an outer part 5 and an inner part 7 are joined to be formed into a tubular shape; and a resin 9 coating an inner surface of the tubular member 3.

The tubular member 3 is configured to be axially crushed to absorb crashworthiness energy, and has a top portion and side wall portions continuous to the top portion. For example, as illustrated in FIG. 1, the tubular member 3 is formed into a tubular shape in which the outer part 5 having a hat-shaped cross section and made of a metal sheet and the plate-shaped inner part 7 made of a metal sheet are joined, and has a closed cross-sectional space inside.

The closed cross-sectional space refers to a space formed by a continuous closed cross-section along the axial direction in the tubular member 3 illustrated in FIG. 1, where the cross-sectional shape of the peripheral wall portion of the tubular member 3 in the direction intersecting the axial direction of the tubular member 3 is a closed cross-section. Such a closed cross-sectional space is formed by joining the outer part 5 of the hat-shaped cross section and the inner part 7 of the flat shape, and spot welding can be applied to join the outer part 5 and the inner part 7, for example.

The tubular member 3 having such a closed cross-sectional space is used for automotive parts having a closed cross section shape, such as front side members extending in the front and rear directions of the automotive body at the left and right positions of the front part of the automotive body and forming part of the automotive body frame, and crash boxes installed at the front or rear ends of the automotive body frame. The automotive parts are disposed in the automotive body such that the axial direction (longitudinal direction) of the tubular member 3 coincides with the front and rear directions of the automotive body.

Examples of the types of metal sheets used for the tubular member 3 used as automotive parts include a cold rolled steel sheet, a hot rolled steel sheet, a stainless steel sheet, a zinc-based coating steel sheet, a zinc alloy coating steel sheet, an aluminum alloy coating steel sheet, and an aluminum alloy sheet.

As illustrated in FIG. 1 and FIG. 2, the resin 9 is coating an inner surface of the outer part 5 constituting the tubular member 3 with a thickness of 8 mm or less, and forms a part of the closed cross-sectional space of the tubular member 3. The resin 9 adheres to the outer part 5 with an adhesive strength of 10 MPa or more.

Examples of the type of the resin 9 in the automotive crashworthiness energy absorptive part 1 according to the first embodiment include a thermoplastic resin, a thermoset resin, and an elastomer resin. Examples of the thermoplastic resin include a vinyl resin (such as vinyl acetate and vinyl chloride), an acrylic resin, a polyamide resin, a polystyrene resin, and a cyanoacrylate resin. Examples of the thermoset resin include an epoxy resin, a urethane resin, an ester resin, a phenolic resin, a melamine resin, and a urea resin. Examples of the elastomer resin include a nitro rubber resin, a styrene butadiene rubber resin, a modified silicone resin, a butyl rubber resin, a urethane rubber resin, and an acrylic rubber resin.

As the resin 9, a foamed resin is preferred in view of the weight reduction of the automotive crashworthiness energy absorptive part 1. Note that, when a foamed resin is used as the resin 9, the foaming ratio is not particularly limited.

Note that the adhesive strength between the resin 9 and the tubular member 3 may be a maximum sheared stress or a mean sheared stress acting on an interface between the metal sheet and the resin. For example, the maximum sheared stress or the mean sheared stress can be determined by crashworthiness analysis of a double-layered square column in which a metal sheet (such as steel sheet) and a resin adhere to each other.

The adhesive strength between the resin 9 and the tubular member 3 may be determined in a manner that a part of the resin 9 and the tubular member 3 after adhesion is cut out, the cut resin 9 and tubular member 3 are placed in a tensile testing machine, and the resin 9 on one side and the tubular member 3 on the other side are pulled. Alternatively, the adhesive strength between the resin 9 and the tubular member 3 may be measured in a manner that a part of the tubular member 3 and the resin 9 after adhesion is cut out and placed in a tensile testing machine, and one part grasps the resin 9 while the other part grasps a gripping part (not shown) formed by bending the tubular member 3 made of metal sheet and pulls the same, or a gripping part is joined to the tubular member 3 and the gripping part grasped by the tensile testing machine and pulled.

As described above, in the automotive crashworthiness energy absorptive part 1 according to the first embodiment, the inner surface of the tubular member 3 is coated with the resin 9, but in accordance with aspects of the present invention, the inner surface of the tubular member may be patched with a plate-shaped resin having a thickness of 8 mm or less with an adhesive. Furthermore, the inner surface of the tubular member may be patched with a film-shaped resin having a thickness of about 100 μm, similarly to a laminate in a laminated steel sheet. The adhesive strength between the plate-shaped resin or the film-shaped resin and the inner surface of the tubular member needs to be 10 MPa or more.

<Method for Manufacturing Automotive Crashworthiness Energy Absorptive Part>

Next, a method for manufacturing an automotive crashworthiness energy absorptive part according to the first embodiment is described.

As exemplified in FIG. 1 and FIG. 2, the method for manufacturing an automotive crashworthiness energy absorptive part according to the first embodiment is a method for manufacturing an automotive crashworthiness energy absorptive part 1 having a tubular member 3 provided at a front portion or a rear portion of an automotive body and configured to absorb crashworthiness energy when crashworthiness load is input from the front side or the rear side of the automotive body, and includes a step of coating an inner surface of the tubular member 3 with a resin 9, and a step of performing heat treatment on the tubular member 3 coated with the resin 9 and improving adhesive strength.

At the step of coating the inner surface of the tubular member 3 with the resin 9, the tubular member 3 in which an outer part 5 having a hat-shaped cross section and made of a metal sheet and an inner part 7 having a plate shape and made of a metal sheet are joined may be formed and then the inner surface of the tubular member 3 may be coated with the resin 9 with a thickness of 8 mm or less, or alternatively, sites of the outer part 5 and the inner part 7 corresponding to the inner surface of the tubular member 3 may be coated with the resin with a thickness of 8 mm or less and then the outer part 5 and the inner part 7 may be joined to form the tubular member 3.

Specific examples of the method for coating with the resin 9 include a method for coating the inner surface of the tubular member 3 by spraying the resin 9 with a spray nozzle, a method for coating the inner surface of the tubular member 3 with the resin 9 by use of a brush or the like, and a method for coating the inner surface of the tubular member 3 with the resin 9 by impregnating the tubular member 3 in a tank in which paint containing the resin 9 is stored. Note that a part of the peripheral wall portion in the closed cross-sectional space in the tubular member 3 was coated with the resin in consideration of the weight increased by the resin.

At the step of performing heat treatment, the tubular member 3 coated with the resin 9 is subjected to heat treatment under predetermined conditions to cause the resin 9 to adhere to the inner surface of the tubular member 3 with an adhesive strength of 10 MPa or more. In this case, the resin 9 and the tubular member 3 can adhere to each other by the adhesive capacity of the resin 9 itself or by an adhesive.

In the case of adhesion by the adhesive capacity of the resin 9 itself, heat treatment may be performed after the inner surface of the tubular member 3 is coated with the resin 9, and temperature and time of the heat treatment may be appropriately adjusted depending on the type of the coating resin 9 such that the adhesive strength becomes 10 MPa or more. In the case of adhesion with an adhesive, on the other hand, heat treatment may be performed after the resin 9 and the inner surface of the tubular member 3 adhere to each other with an adhesive, and temperature and time of the heat treatment may be appropriately adjusted such that the adhesive strength of the adhesive becomes 10 MPa or more. The step of performing heat treatment in accordance with aspects of the present invention may serve also as, for example, a step of performing baking finish by painting the outer surface of the tubular member 3 with paint.

Note that, as described above, the adhesive strength between the resin 9 and the inner surface of the tubular member 3 can be determined by crashworthiness analysis of a double-layered square column in which a metal sheet (such as steel sheet) and a resin adhere to each other, or by measurement using a tensile testing machine.

As described above, in the method for manufacturing an automotive crashworthiness energy absorptive part according to the first embodiment, the inner surface of the tubular member 3 is coated with the resin 9, but in accordance with aspects of the present invention, the inner surface of the tubular member may be patched with a plate-shaped resin having a thickness of 8 mm or less with an adhesive. Furthermore, the inner surface of the tubular member may be patched with a film-shaped resin having a thickness of about 100 μm, similarly to a laminate in a laminated steel sheet. At the step of performing heat treatment, the adhesive strength between the plate-shaped resin or the film-shaped resin and the inner surface of the tubular member should be adjusted to be 10 MPa or more.

Next, the reason why crashworthiness energy absorptive properties improve in the process of axial crush of the automotive crashworthiness energy absorptive part 1 according to the first embodiment is described below.

In conventional automotive crashworthiness energy absorptive parts having a tubular member made of a metal sheet such as a steel sheet, the tubular member absorbs the crashworthiness energy by repeatedly generating buckling deformation in a bellows shape, in the process in which crashworthiness load is input at the axial end of the automotive crashworthiness energy absorptive part and exceeds the buckling strength of the tubular member, leading to axial crush of the tubular part.

In this process, if the tubular member buckles and deforms without fracturing, the crashworthiness energy is most easily absorbed. However, if fractures occur on the outer surface of the tip of the bellows-shaped bend portion where the tubular member is buckled and deformed in a bellows shape, the crashworthiness energy absorption is insufficient and the original capability cannot be achieved. Because the bellows-shaped bend portion caused by the buckling deformation of the tubular member has a small bending radius inherent to the metal sheet, stress concentrates on the outer surface of the bend and fractures are likely to occur.

In the shape of the tubular member, the part that has a high capacity to absorb crashworthiness energy is the part that connects the top portion and the side wall portion, but it is also the part that is most susceptible to work-hardening when the tubular member is pressed. As a result, fractures are likely to occur at the tip of the bellows-shaped bend portion connecting the top portion and the side wall portion due to the decrease in ductility caused by work-hardening.

In particular, high-strength steel sheet, which has recently been adopted for automotive parts to achieve both crash worthiness and weight reduction, has less ductility than conventional strength steel sheet. According to the relation between the strength level of the steel sheet and the fracture limit for bending radius R/thickness t of the steel sheet (see Reference 1 below) illustrated in Table 1 and FIG. 3, when the tensile strength TS of the steel sheet becomes higher, fracture is more likely to occur at a larger bending radius. Therefore, when automotive crashworthiness energy absorptive parts made of high-strength steel sheets buckle and deform in a bellows shape, fracture is likely to occur at the bend tip of the bellows shape as the strength of the steel sheet increases.

(Reference 1) Kohei Hasegawa, Shinjiro Kaneko, Kazuhiro Seto, "High-strength Cold-Rolled and Alloyed Hot-Dip Galvanized (GA) Steel Sheet Contributing to Weight Reduction of Body Parts around Cabin," JFE Technical Report, No. 30 (August 2012), p. 6-12.

TABLE 1

| Steel sheet strength level | TS [MPa] | R/t [—] |
|---|---|---|
| 780 MPa class | 810 | less than 1.0 |
| 980 MPa class | 1020 | 1.0 |
| 1180 MPa class | 1210 | 1.5 |
| 1320 MPa class | 1330 | 2.0 |
| 1470 MPa class | 1510 | 2.5 |

As a result, when applying high-strength steel sheets to automotive crashworthiness energy absorptive parts, the above was a factor that hindered the progress of further increasing the strength of steel sheets. In accordance with aspects of the present invention, the inventors have focused on the fact that the bellows-shaped bend portion of the tubular member has a small bending radius inherent in the metal sheet described above, and conceived the idea that if the bending radius can be increased, fractures at the bend tip of the bellows shape caused by buckling deformation during axially crushing can be prevented.

In other words, when the tubular member 3 made of metal sheets is buckled and deformed in the early stage of the axial crushing impact, the bending radius of the convex bending portion can be held large by compressing the convexly deformed bending portion with an intervening object between the metal sheets. However, the addition of an intervening object between the metal sheets leads to an increase in the weight of the part, and hence the intervening object needs to be as light as possible.

Therefore, in accordance with aspects of the present invention, a resin is caused to adhere to the inner surface of the tubular member, and the resin is sandwiched between the metal sheets as the intervening object in the convex bending portion. As a result, the bending radius of the convex bending portion can be made larger than the fracture limit for bending radius inherent in the metal sheets with the resin intervening, and fractures are prevented from occurring in the bellows-shaped bending portion of the tubular member. As a result, the crashworthiness energy absorptive properties can be prevented from deteriorating.

However, if the adhesive strength between the resin coating the inner surface of the tubular member of an automotive crashworthiness energy absorptive part and the inner surface of the tubular member is small, the resin coating the inner surface of the tubular member is released and falls from the tubular member in the process from immediately after the buckling deformation starts due to the input of crashworthiness load to the axial end of the automotive crashworthiness energy absorptive part to the end of the axial crushing deformation. As a result, fractures occur during buckling deformation, and the crashworthiness energy absorptive properties cannot be improved.

In contrast, in the automotive crashworthiness energy absorptive part 1 according to the first embodiment, the resin 9 coating and adhering to the inner surface of the tubular member 3 with an adhesive strength of 10 MPa or more compressively deforms with the tubular member 3 without being released and falling from the inner surface of the tubular member 3 in the process of axial crushing.

This improves the buckling strength of the tubular member 3 and also allows the tubular member 3 to undergo repeated buckling deformation in a bellows shape manner without reducing the deformation resistance of the tubular member 3, resulting in improved crashworthiness energy absorptive properties.

Furthermore, by making the thickness of the resin 9 after coating and heated 8 mm or less, when the tubular member 3 made of the metal sheet is buckled and deformed in the initial stage of the axial crushing impact, the resin is sandwiched between the metal sheets in the convexly deformed bending portion. This prevents the bending radius of the convex bending portion from becoming smaller than the fracture limit for bending radius inherent in the metal sheet, and prevents fracture of the metal sheet from occurring. As a result, the crashworthiness energy absorptive properties can be prevented from deteriorating.

Unlike the conventional cases, it is not necessary to fill the entire closed cross-sectional space of the tubular member 3 with a resin. This is because, for the reason described above, it is only necessary to make the resin present at the tip of the bellows-shaped bend portion due to buckling deformation during axially crushing. Therefore, in order for the resin to be present with buckling deformation, the resin needs to adhere to the part connecting the top portion and the side wall portions of the tubular member 3.

Figure 4:
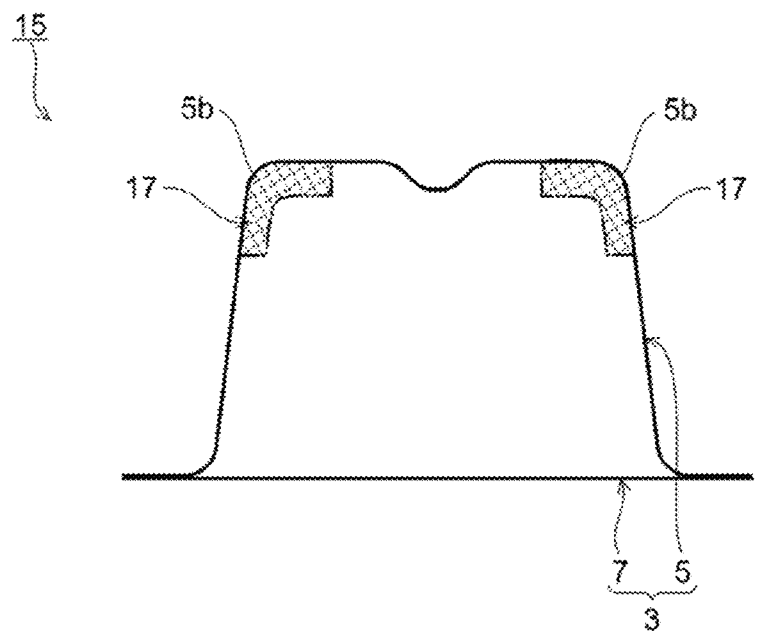
FIG. 4 is a cross-sectional view illustrating another aspect of the automotive crashworthiness energy absorptive part according to the first embodiment of the present invention (No. 1).

Therefore, even if a punch shoulder R portion 5*b* of the outer part 5 is coated with a resin 17 as in an automotive crashworthiness energy absorptive part 15 illustrated in FIG. 4, the crashworthiness energy absorptive properties when crashworthiness load is input in the axial direction can be prevented from deteriorating and the buckling strength can be improved.

Figure 5:
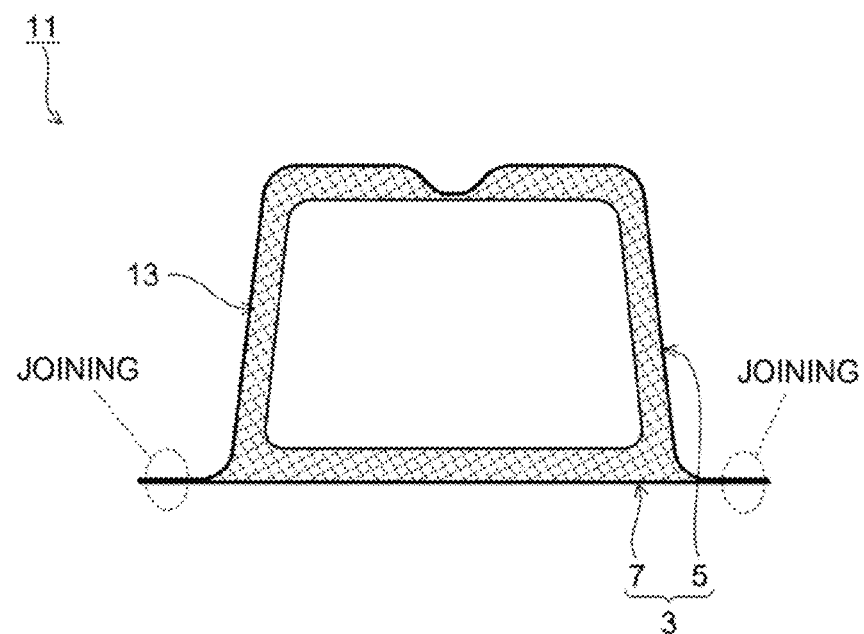
FIG. 5 is a cross-sectional view illustrating another aspect of the automotive crashworthiness energy absorptive part according to the first embodiment of the present invention (No. 2).

As illustrated in FIG. 5, even in an automotive crashworthiness energy absorptive part 11 where the entire inner surface of the tubular member 3 is coated with a resin 13 to form all of the peripheral wall portions of the closed cross-sectional space, the effect of improving the buckling strength of the tubular member 3 and preventing fracture can be obtained.

Furthermore, in the automotive crashworthiness energy absorptive part 1 according to the first embodiment, the resin 9 coating the inner surface of the tubular member 3 also functions as a damping material to absorb vibrations. For example, when the automotive crashworthiness energy absorptive part 1 is used as a front side member, which absorbs crashworthiness energy by axial crushing, the resin 9 can absorb the vibration of the automotive engine mounted on the front side member, thereby improving vibration-damping properties. This point is demonstrated in the example described below.

Note that, in the above description, the tubular member 3 is formed by joining the outer part 5 having a hat-shaped cross section and the plate-shaped inner part 7 by spot welding or the like. The tubular member 3 is not limited thereto. For example, the tubular member 3 may be formed by joining members of hat-shaped cross section or U-shaped cross section to form a tubular shape, or may be formed by forming a cylindrical member or the cross section of a cylindrical member into a polygonal shape, or combining flange surfaces of a plurality of members to form a polygonal shape.

Furthermore, the above description is about the automotive crashworthiness energy absorptive part 1 in which the inner surface of the tubular member 3 is coated with the resin 9, but the same functions and effects as in the automotive crashworthiness energy absorptive part 1 according to the first embodiment can be obtained even when the inner surface of the tubular member is patched with a plate-shaped or film-shaped resin and the adhesive strength thereof is 10 MPa or more.

Second Embodiment

<Automotive Crashworthiness Energy Absorptive Part>

In the automotive crashworthiness energy absorptive part 1 according to the above-mentioned first embodiment, in order to reliably secure an adhesive strength of 10 MPa or more between the inner surface of the tubular member 3 and the resin 9 and prevent the case where the resin 9 adhering to the inner surface of the tubular member 3 is released in the process of axial crush and crashworthiness energy absorptive properties are not improved, the inventors of the present invention have considered a unit for preventing the release of the resin 9.

Figure 6:
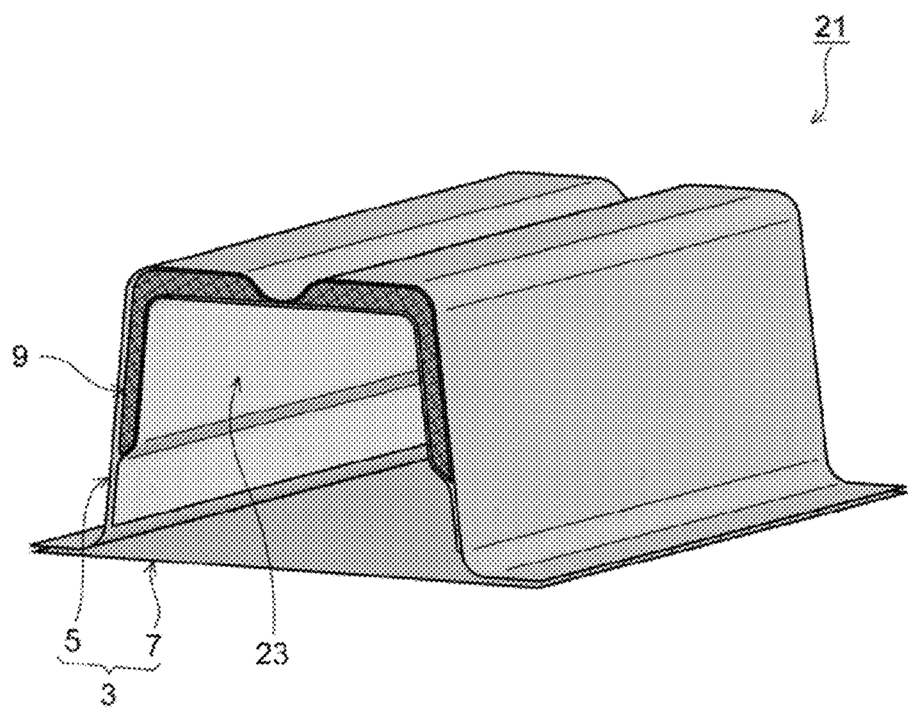
FIG. 6 is a perspective view illustrating an automotive crashworthiness energy absorptive part according to a second embodiment of the present invention.
Figure 7:
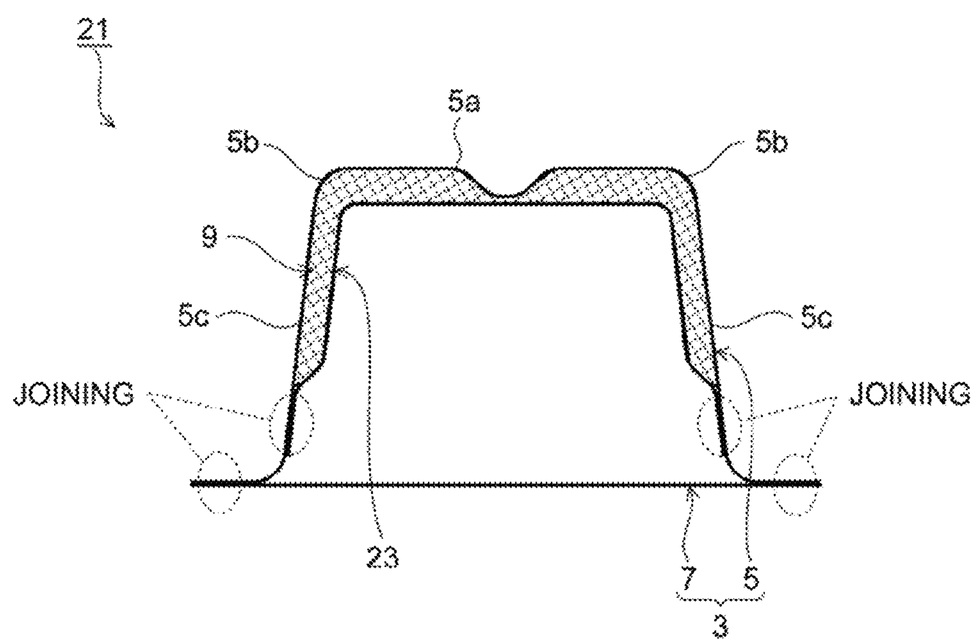
FIG. 7 is a cross-sectional view illustrating the automotive crashworthiness energy absorptive part according to the second embodiment of the present invention.
Figure 8:
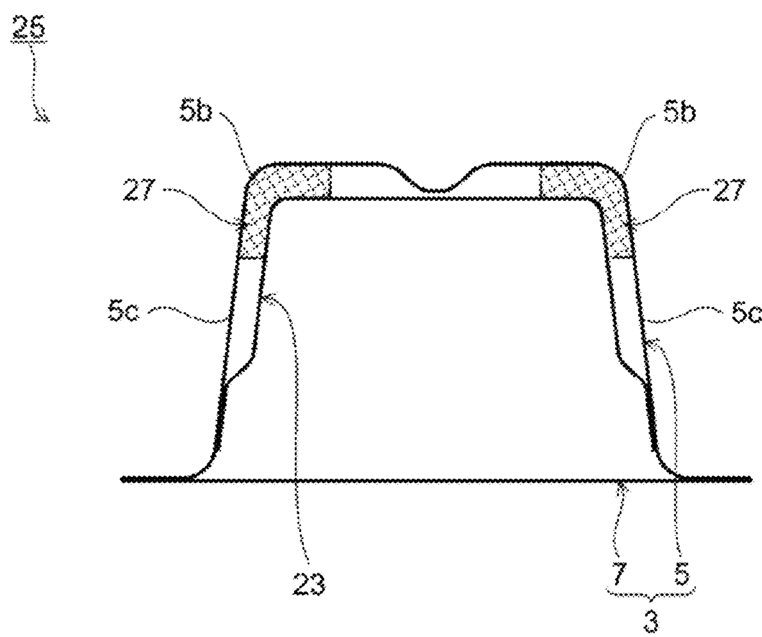
FIG. 8 is a cross-sectional view illustrating another aspect of the automotive crashworthiness energy absorptive part according to the second embodiment of the present invention.

As illustrated in FIG. 6 and FIG. 7, an automotive crashworthiness energy absorptive part 21 according to a second embodiment of the present invention includes a tubular member 3 to be axially crushed to absorb crashworthiness energy and having a top portion and side wall portions continuous to the top portion, and a resin 9 coating the inner surface of the tubular member 3. The coating resin 9 has a thickness of 8 mm or less, and adheres to the inner surface with an adhesive strength of 10 MPa or more. The automotive crashworthiness energy absorptive part 21 further includes a release prevention member 23 that covers the surface of the resin 9 and is joined to the inner surfaces of side wall portions 5*c* of the tubular member 3 in order to prevent the resin 9 from being released from the inner surfaces. The resin 9 adheres to the release prevention member 23 with an adhesive strength of 10 MPa or more.

The release prevention member 23 is made of a metal sheet (such as steel sheet). As illustrated in FIG. 7, the release prevention member 23 covers the resin 9 coating the outer part 5, which is a part of the inner surface of the tubular member 3, and is joined to the inner surfaces of the side wall portions 5*c* of the outer part 5 by spot welding or the like, for example. Note that the resin 9 needs to be present at least in a region connecting a top portion 5*a* and the side wall portion 5*c* and the resin 9 needs to be reduced in weight as much as possible and the longitudinal wall height of the resin 9 needs to be decreased, and hence the release prevention member 23 is joined to the side wall portions 5*c* of the outer part 5.

Similarly to the above-mentioned first embodiment, the adhesive strength between the resin 9 and the tubular member 3 and between the resin 9 and the release prevention member 23 may be determined by crashworthiness analysis of a double-layered square column in which a metal sheet (such as steel sheet) and a resin adhere to each other, or may be determined by measurement by a tensile testing machine after cutting out a part of the resin, the tubular member, and the release prevention member after adhesion.

As described above, in the automotive crashworthiness energy absorptive part 21 according to the second embodiment, the inner surface of the tubular member 3 is coated with the resin 9, but in accordance with aspects of the present invention, the inner surface of the tubular member may be patched with a plate-shaped resin having a thickness of 8 mm or less with an adhesive. Furthermore, the inner surface of the tubular member may be patched with a film-shaped resin having a thickness of about 100 μm, similarly to a laminate in a laminated steel sheet. The adhesive strength between the plate-shaped resin or the film-shaped resin and the inner surface of the tubular member only needs to be 10 MPa or more.

<Method for Manufacturing Automotive Crashworthiness Energy Absorptive Part>

Next, a method for manufacturing an automotive crashworthiness energy absorptive part according to the second embodiment is described.

As illustrated in FIG. 6 and FIG. 7, one aspect of the method for manufacturing an automotive crashworthiness energy absorptive part according to the second embodiment is a method for manufacturing an automotive crashworthiness energy absorptive part 21 to be provided at a front portion or a rear portion of an automotive body and including a tubular member 3 configured to absorb crashworthiness energy when crashworthiness load is input from a front side or a rear side of the automotive body and having a top portion and side wall portions continuous to the top portion, and includes a step of coating the inner surface of the tubular member 3 with a resin 9 with a thickness of 8 mm or less, a step of patching the surface of the resin 9 with the release prevention member 23 and joining the release prevention member 23 to the inner surface of the tubular member 3, and a step of performing heat treatment on the tubular member 3 coated with the resin 9 under predetermined conditions, and causing the resin 9 to adhere to the inner surface of the tubular member 3 and to the release prevention member 23 with an adhesive strength of 10 MPa or more.

At the step of coating the inner surface of the tubular member 3 with the resin 9, after the tubular member 3 is formed by joining the outer part 5 having a hat-shaped cross section and made of a metal sheet and the inner part 7 having a plate shape and made of a metal sheet, the inner surface of the tubular member 3 is coated with the resin 9 with a thickness of 8 mm or less. At this time, the inner surface of the tubular member 3 may be coated with a liquid resin 9 with a thickness of 8 mm or less, or a plate resin 9 having a thickness of 8 mm or less may be caused to adhere to the inner surface of the tubular member 3 with an adhesive.

At the step of joining the release prevention member 23 to the inner surface of the tubular member 3, the release prevention member 23 is caused to patch, or adhere to with an adhesive, the resin coating the inner surface of the tubular member 3, and is joined to the inner surfaces of the side wall portions 5*c* of the outer part 5 by spot welding or the like.

At the step of performing heat treatment, the tubular member 3 coated with the resin 9 and provided with the release prevention member 23 is subjected to heat treatment under predetermined conditions, and the resin 9 and the inner surface of the tubular member 3 and the release prevention member 23 are caused to adhere to one another with an adhesive strength of 10 MPa or more.

Alternatively, in the case where the resin 9 is caused to adhere the inner surface of the tubular member 3 with an adhesive, heat treatment is performed after the resin 9 adhere to the inner surface of the tubular member 3, and the temperature and time of the heat treatment may be adjusted appropriately such that the adhesive strength of the adhesive is 10 MPa or more. The step of performing heat treatment in accordance with aspects of the present invention may also be, for example, a step of painting the outer surface of the tubular member 3 with paint and performing baking finish.

Note that the adhesive strength between the resin 9 and the inner surface of the tubular member 3 can be determined by crashworthiness analysis of a double-layered square column in which a metal sheet (such as steel sheet) and a resin adhere to each other, or by measurement using a tensile testing machine, as described above.

In the above description, in the method for manufacturing an automotive crashworthiness energy absorptive part according to the second embodiment, the inner surface of the tubular member 3 is coated with the resin 9, and then the release prevention member 23 is disposed inside the tubular member 3 and patches the surface of the resin 9 and is joined to the inner surface of the tubular member 3. However, the order of the coating with the resin 9 and the disposition of the release prevention member 23 are not limited to the above-mentioned order.

In other words, as another aspect of the method for manufacturing an automotive crashworthiness energy absorptive part 21 according to the second embodiment, the method may include a step of coating or patching, with a resin 9 with a thickness of 8 mm or less, a release prevention member 23 for preventing the resin 9 from being released from the inner surface of the tubular member 3, a step of bringing the resin 9 coating the release prevention member 23 into contact with the inner surface of the tubular member 3, and joining the release prevention member 23 to the inner surface of the tubular member 3, and a step of causing the resin 9 to adhere to the inner surface of the tubular member 3 and the release prevention member 23 with an adhesive strength of 10 MPa or more by performing heat treatment under predetermined condition.

In the automotive crashworthiness energy absorptive part 21 according to the second embodiment, similarly to the automotive crashworthiness energy absorptive part 1 according to the above-mentioned first embodiment, the resin 9 is prevented from being released from the inner surface of the tubular member 3 in the process of buckling deformation of the tubular member 3 into a bellows shape and axial crushing. As a result, the automotive crashworthiness energy absorptive part 21 according to the present embodiment can prevent the fracture in the tubular member 3 in the early stage of the axial crushing by effectively preventing the bending radius of the buckling deformation portion from becoming less than the fracture limit for bending radius due to the resin 9 being trapped inside the buckling deformation portion when the tubular member 3 is buckled and deformed, thereby further improving the crashworthiness energy absorptive properties.

In the automotive crashworthiness energy absorptive part 21, the resin 9 is coating across the top portion 5*a* of the outer part 5 to include the punch shoulder R portion 5*b*. However, in accordance with aspects of the present invention, a resin 17 may be coating only the punch shoulder R portion 5*b* of the outer part 5, as in an automotive crashworthiness energy absorptive part 25 illustrated in FIG. 8.

In this way, even if the resin 17 is coating only the punch shoulder R portion 5*b* of the outer part 5 and adhered to the outer part 5 and to the release prevention member 23 with an adhesive strength of 10 MPa or more, the resin 17 is prevented from being released from the outer part 5 in the early stage of the axial crush impact, which improves the buckling strength and can improve the crashworthiness energy absorptive properties. When the punch shoulder R portion 5*b*, which has undergone work hardening in the press forming process of the outer part 5, buckles and deforms in the axial crushing process, the resin 17 is sandwiched inside the bending portion of the buckling deformation and prevents the punch shoulder R portion 5*b* from being bent below the fracture limit for bending radius, thereby preventing fracture from occurring.

Also in the automotive crashworthiness energy absorptive part 21 according to the second embodiment, the resin 9 coating the inner surface of the tubular member 3 also functions as a damping material to absorb vibrations.

For example, when the automotive crashworthiness energy absorptive part 21 is used as a front side member, which is a component that absorbs crashworthiness energy by axial crushing, the vibration of the automotive engine mounted on the front side member can be absorbed by the resin 9, thus improving vibration-damping properties.

Furthermore, although the above description refers to the automotive crashworthiness energy absorptive part 21 with the inner surface of the tubular member 3 coated with the resin 9, the same functions and effects as in the automotive crashworthiness energy absorptive part 21 according to the second embodiment can be obtained even if the inner surface of the tubular member is patched with a plate-shaped or film-shaped resin with an adhesive strength of 10 MPa or more.

EXAMPLE

Experiments for confirming the effects of the automotive crashworthiness energy absorptive parts according to aspects of the present invention were performed, and the results are described below.

In the present example, an automotive crashworthiness energy absorptive part according to aspects of the present invention was used as a test specimen to evaluate the absorptive properties of crashworthiness energy by axial crushing test and the damping characteristics by measuring the frequency response function and calculating the character frequency in the impact vibration test.

Figure 9:
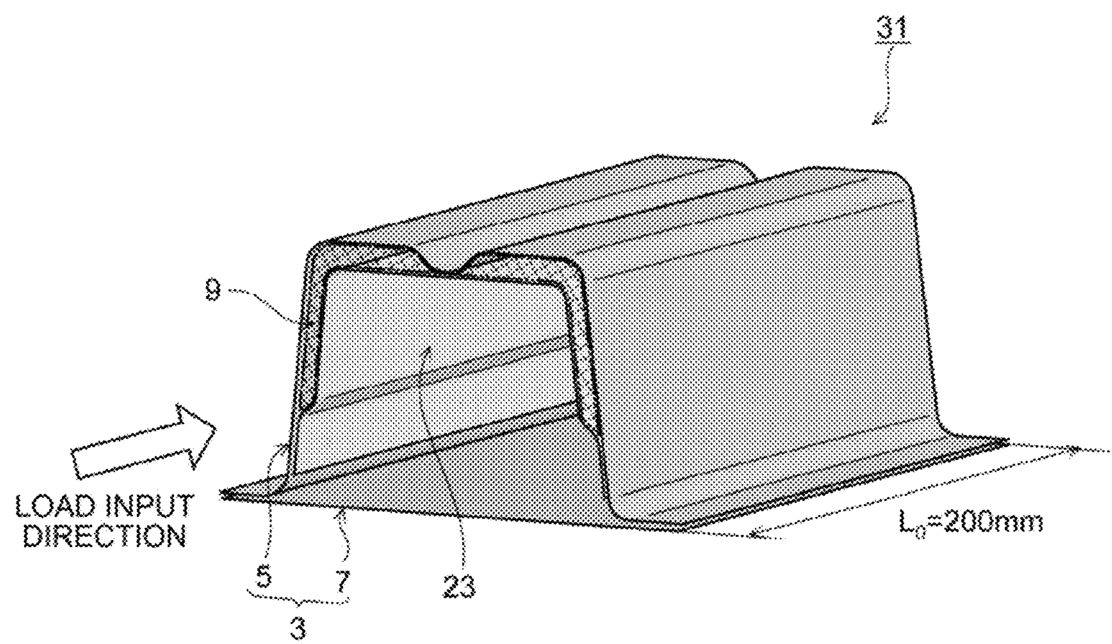
FIG. 9 is a view for describing an axial crush test method in an example.

In the axial crush test, as illustrated in FIG. 9, load was applied in the axial direction of a test specimen 31 with the tubular member 3 at a test speed of 17.8 m/s, and the specimen length (axial length $L_0$ of the test specimen 31) was deformed by 80 mm axial crushing from 200 mm to 120 mm to measure a load-stroke curve indicating a relation between a load and a stroke (amount of axial crushing deformation), and the deformation state and the presence or absence of fracture in the tubular member were observed by photographing with a high-speed camera. From the measured load-stroke curve, the absorption energy from 0 to 80 mm stroke was determined.

Figure 10:
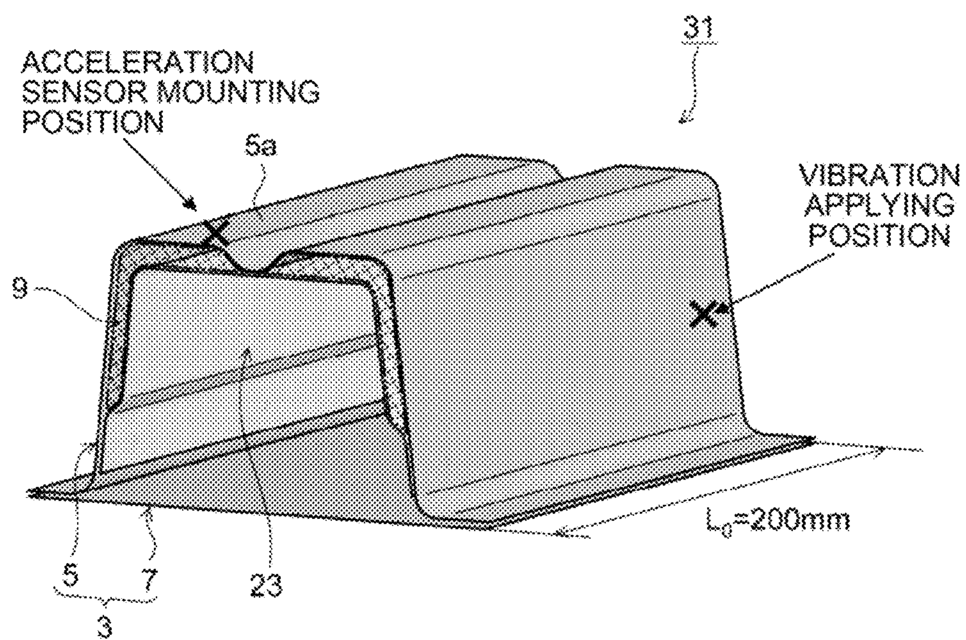
FIG. 10 is a view for describing an impact vibration test method in the example.
Figure 11:
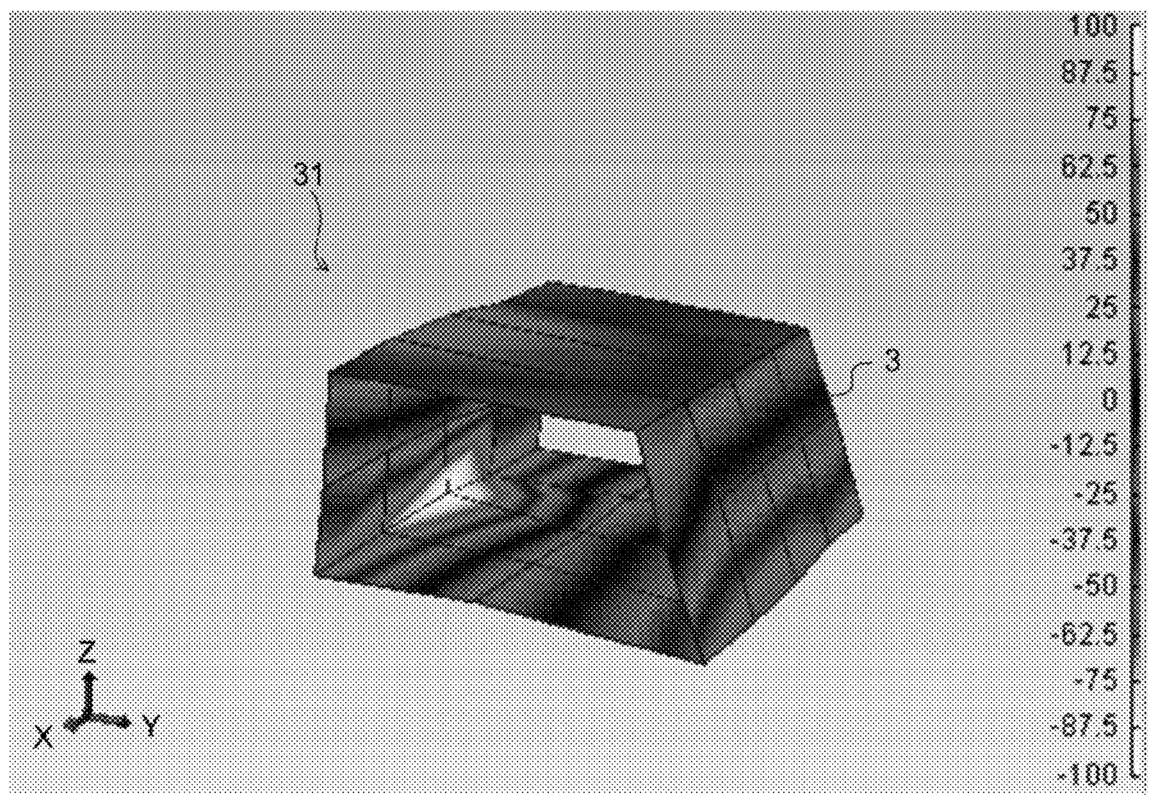
FIG. 11 is a view illustrating a vibration mode whose character frequency is to be calculated in vibration characteristic evaluation by the impact vibration test method in the example.

On the other hand, in the impact vibration test, as illustrated in FIG. 10, an acceleration sensor (NP-3211 from Ono Sokki) is attached to the suspended test specimen 31 near the edge of the top portion 5*a* of the outer part 5. An impact hammer (GK-3100 from Ono Sokki) was used to impact and vibrate the opposite side of the acceleration sensor attachment point on the side wall portion 5*c* of the outer part 5 of the test specimen 31. The impact force and the acceleration generated in the test specimen 31 were taken into the FFT analyzer (CF-7200A from Ono Sokki), and the frequency response function was calculated. Here, the frequency response function was calculated by averaging five blows and curve fitting. The calculated frequency response function was then used to perform vibration mode analysis to obtain the character frequencies in the same mode. FIG. 11 illustrates the targeted vibration modes.

Figure 12:
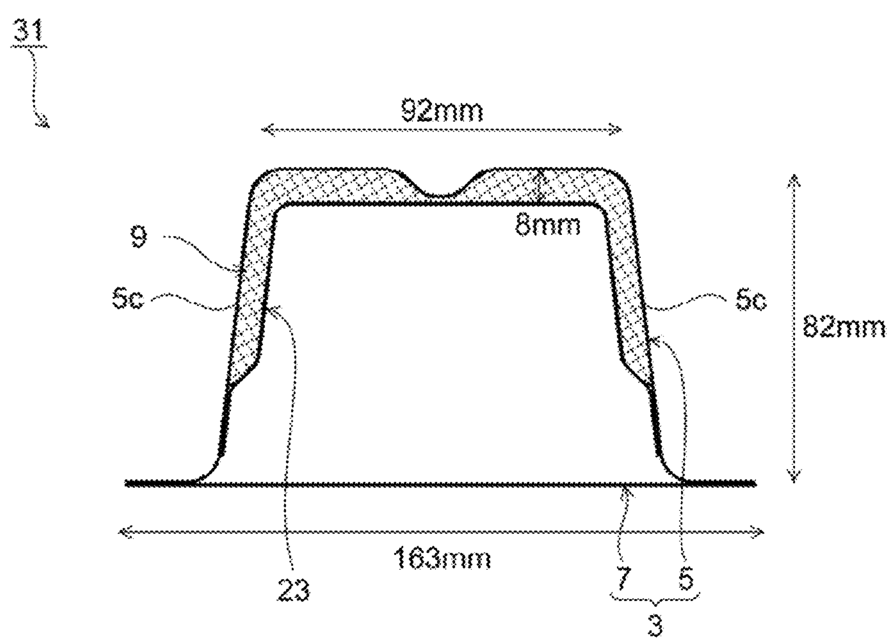
FIG. 12 is a view illustrating a structure of a test specimen used as an example of the present invention in the example (No. 1).
Figure 13:
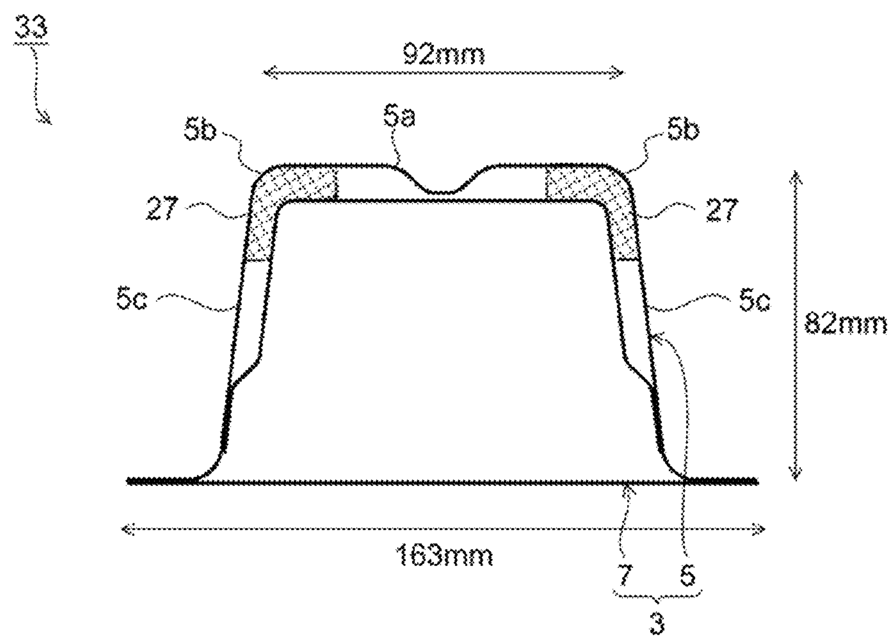
FIG. 13 is a view illustrating a structure of a test specimen used as an example of the present invention in the example (No. 2).
Figure 14:
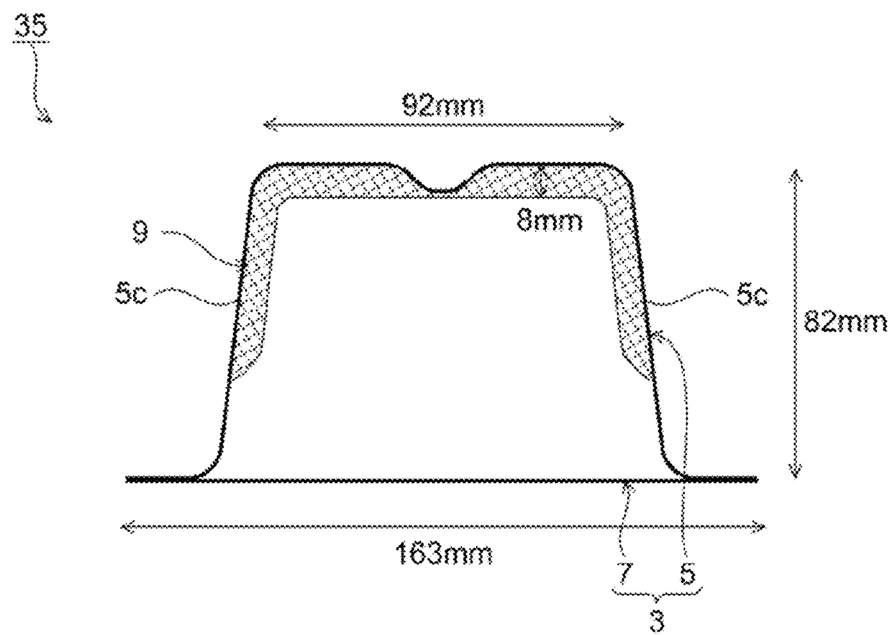
FIG. 14 is a view illustrating a structure of a test specimen used as an example of the present invention in the example (No. 3).

FIG. 12 to FIG. 14 illustrate the structure and shape of the test specimens used as examples of the present invention.

FIG. 12 illustrates a test specimen 31 as an automotive crashworthiness energy absorptive part 21 (FIG. 6 and FIG. 7) according to the above-mentioned second embodiment of the present invention. The test specimen 31 has a tubular member 3 in which an outer part 5 and an inner part 7 are joined by spot welding, and a release prevention member 23 is joined to the inner surfaces of the side wall portions 5*c* of the outer part 5 so as to cover the resin 9 coating or patching the inner surfaces of the top portion 5*a*, the punch shoulder R portions 5*b*, and the side wall portions 5*c* in the outer part 5.

FIG. 13 illustrates a test specimen 33 as an automotive crashworthiness energy absorptive part 25 (FIG. 8) according to another aspect of the second embodiment of the present invention. Similarly to the test specimen 31, the test specimen 33 has a tubular member 3 in which an outer part 5 and an inner part 7 are joined by spot welding, a resin 27 is coating or patching the punch shoulder R portions 5*b* of the outer part 5, and a release prevention member 23 is disposed so as to cover the surface of the resin 27 and joined to the inner surfaces of the side wall portions 5*c* of the outer part 5.

FIG. 14 illustrates a test specimen 35 as an automotive crashworthiness energy absorptive part 1 (FIG. 1 and FIG. 2) according to the above-mentioned first embodiment of the present invention. The test specimen 35 has a tubular member 3 in which an outer part 5 and an inner part 7 are joined by spot welding, and a resin 9 is coating or patching the inner surfaces of the top portion 5*a*, the punch shoulder R portions 5*b*, and the side wall portions 5*c* in the outer part 5.

The outer parts 5 and the inner parts 7 used for the test specimen 31, the test specimen 33, and the test specimen 35 illustrated in FIG. 12 to FIG. 14 have the same shape and dimensions, and the test specimen length $L_0$ was 200 mm.

In the test specimen 31, the test specimen 33, and the test specimen 35, the resin 9 and the resin 27 were epoxy or urethane foamed resins. The thickness of the coating or patching resin 9 or resin 27 was 0.1 mm, 1 mm, 3 mm, or 8 mm or less (see FIG. 15), and the adhesive strength between the inner surface of the outer part 5 and the resin 9 or the resin 17 was in the range according to aspects of the present invention (10 MPa or more). Note that the adhesive strength in the present example was a maximum sheared stress or a mean sheared stress determined by crashworthiness analysis of a double-layered square column in which the metal sheet used in the tubular member and the resin adhere to each other, the maximum sheared stress or the mean sheared stress acting on the interface between the metal sheet and the resin.

Figure 16:
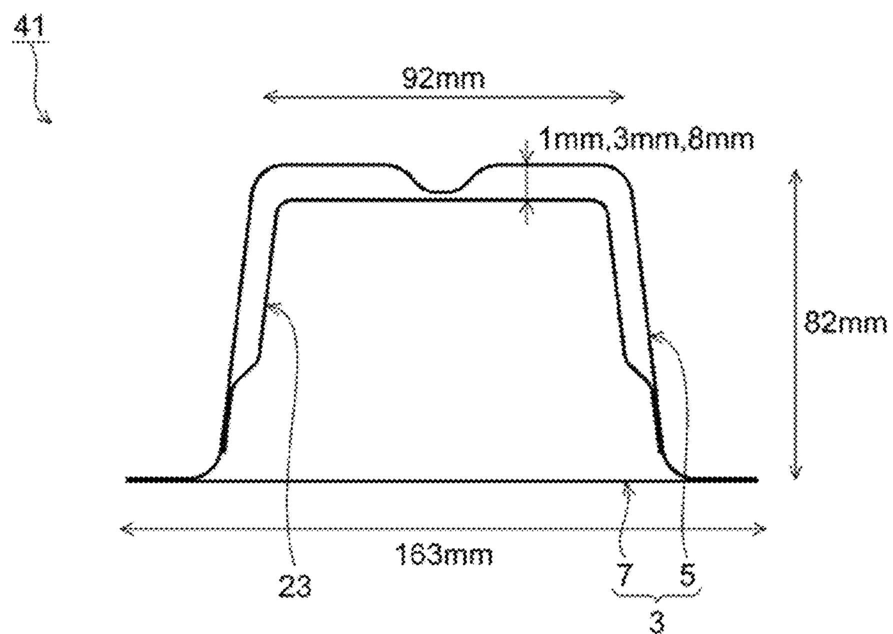
FIG. 16 is a view illustrating a structure of a test specimen used as a comparative example in the example.

Furthermore, in the present example, a test specimen 41 (FIG. 16), which had the same shape and dimensions as the tubular member 3 and the release prevention member 23 in examples of the present invention, and was coated or patched with no resin, and a test specimen 31, a test specimen 33, or a test specimen 35, in which the adhesive strength of the resin 9 or the resin 17 was smaller than 10.0 MPa, which was smaller than the range according to aspects of the present invention, were used as comparative examples, and axial crush tests and vibration impact tests were performed similarly to examples of the present invention. Table 2 illustrates conditions of the structure, resin type, and adhesive strength of the test specimens used as examples of the present invention and comparative examples. Note that, regarding the range of the resin coating in Table 2, "outer RF" refers to the outer part 5, and "punch shoulder R" refers to the punch shoulder R portion 5*b* of the outer part 5.

TABLE 2

| | Structure | | | | | | Resin coating | | | |
|---|---|---|---|---|---|---|---|---|---|---|
| | Outer part | | Release prevention member | | Inner part | | | | | |
| | Tensile strength [MPa] | Thickness [mm] | Tensile strength [MPa] | Thickness [mm] | Tensile strength [MPa] | Thickness [mm] | Implementation | Coat or patch | Thickness [mm] | Range |
| First example | 590 | 1.2 | 270 | 0.5 | 590 | 1.2 | Yes | Coat | 8 | Outer RF |
| Second example | 590 | 1.2 | 270 | 0.5 | 590 | 1.2 | Yes | Coat | 1 | Outer RF |
| Third example | 1180 | 1.2 | 270 | 0.5 | 590 | 1.2 | Yes | Coat | 1 | Outer RF |
| Fourth example | 590 | 1.2 | 270 | 0.5 | 590 | 1.2 | Yes | Coat | 3 | Punch shoulder R |
| Fifth example | 590 | 1.2 | 270 | 0.5 | 590 | 1.2 | Yes | Coat | 3 | Outer RF |
| Sixth example | 1180 | 1.2 | — | — | 590 | 1.2 | Yes | Patch | 1 | Outer RF |
| Seventh example | 1180 | 1.2 | 270 | 0.5 | 590 | 1.2 | Yes | Patch | 0.1 | Outer RF |
| First comparative example | 590 | 1.2 | 270 | 0.5 | 590 | 1.2 | No | — | — | — |
| Second comparative example | 590 | 1.4 | 270 | 0.5 | 590 | 1.2 | No | — | — | — |
| Third comparative example | 980 | 1.2 | 270 | 0.5 | 590 | 1.2 | No | — | — | — |
| Fourth comparative example | 1180 | 1.2 | 270 | 0.5 | 590 | 1.2 | No | — | — | — |
| Fifth comparative example | 1180 | 1.2 | 270 | 0.5 | 590 | 1.2 | Yes | Coat | 1 | Outer RF |
| Sixth comparative example | 590 | 1.2 | 270 | 0.5 | 590 | 1.2 | Yes | Coat | 3 | Punch shoulder R |
| Seventh comparative example | 590 | 1.2 | 270 | 0.5 | 590 | 1.2 | Yes | Coat | 3 | Outer RF |
| Eighth comparative example | 1180 | 1.2 | — | — | 590 | 1.2 | Yes | Patch | 1 | Outer RF |
| Ninth comparative example | 590 | 1.2 | 270 | 0.5 | 590 | 1.2 | Yes | Coat | 9 | Outer RF |

TABLE 2-continued

| | Test specimen weight [kg] | Resin adhesive strength [MPa] | Resin: Resin type | Resin: Foaming ratio | Fracture occurrence | Absorption energy Test speed 17.8 m/s [kj] | Absorption energy Test speed 17.8 m/s [kj/kg] | Vibration characteristics Character frequency [Hz] |
|---|---|---|---|---|---|---|---|---|
| First example | 1.28 | 11.9 | Urethane | 2 | No | 12.8 | 10.0 | 450 |
| Second example | 1.12 | 12.1 | Urethane | 2 | No | 9.5 | 8.5 | 330 |
| Third example | 1.15 | 15.5 | Epoxy | 2 | No | 12.3 | 10.7 | 330 |
| Fourth example | 1.12 | 11.3 | Epoxy | 2 | No | 9.0 | 8.0 | 355 |
| Fifth example | 1.16 | 10.4 | Epoxy | 2 | No | 9.8 | 8.4 | 355 |
| Sixth example | 0.96 | 12.5 | Urethane | 2 | No | 11.2 | 11.7 | 345 |
| Seventh example | 1.08 | 12.5 | Urethane | 2 | No | 11.8 | 10.9 | 300 |
| First comparative example | 1.06 | — | — | — | No | 6.5 | — | 155 |
| Second comparative example | 1.17 | — | — | — | No | 7.0 | 6.0 | 175 |
| Third comparative example | 1.06 | — | — | — | Yes | 8.1 | 7.6 | 155 |
| Fourth comparative example | 1.07 | — | — | — | Yes | 8.5 | 7.9 | 155 |
| Fifth comparative example | 1.15 | 0.0 | Urethane | 2 | Yes | 8.7 | 7.6 | 255 |
| Sixth comparative example | 1.13 | 4.0 | Urethane | 2 | Yes | 7.6 | 6.7 | 285 |
| Seventh comparative example | 1.17 | 9.0 | Epoxy | 2 | Yes | 8.3 | 6.5 | 295 |
| Eighth comparative example | 0.96 | 4.0 | Urethane | 2 | Yes | 8.8 | 9.2 | 265 |
| Ninth comparative example | 1.33 | 0.0 | Urethane | 2 | Yes | 8.8 | 6.6 | 275 |

The first example to the seventh example are those in which the adhesive strength of the resin was within the range according to aspects of the present invention (10 MPa or more). The first example to the fifth example and the seventh example are those in which the test specimen 31 or the test specimen 33 provided with the release prevention member 23 was used, and the sixth example used the test specimen 35 without a release prevention member. On the other hand, the first comparative example to the fourth comparative example are those coated or patched with no resin, and the fifth comparative example to the seventh comparative example are those in which the adhesive strength of the resin was outside the range according to aspects of the present invention (less than 10 MPa).

FIG. 17 to FIG. 20 illustrate measurement results of load-stroke curves and deformed states of test specimens when axial crush tests were performed by using test specimens according to the first comparative example, the fourth comparative example, the first example, and the third example. In FIG. 17 to FIG. 20, the left graph is a load-stroke curve in which the horizontal axis is a stroke (mm) indicating a deformed amount of the test specimen in the axial direction from the start of crush and the vertical axis is a load (kN) input to the test specimen, and the right photo indicates the deformation state of the specimen at a stroke of 50 mm, which was captured by a high-speed camera. Furthermore, absorption energy indicated in the load-stroke curve is an absorption amount of crashworthiness energy with strokes of 0 to 80 mm.

Figure 17:
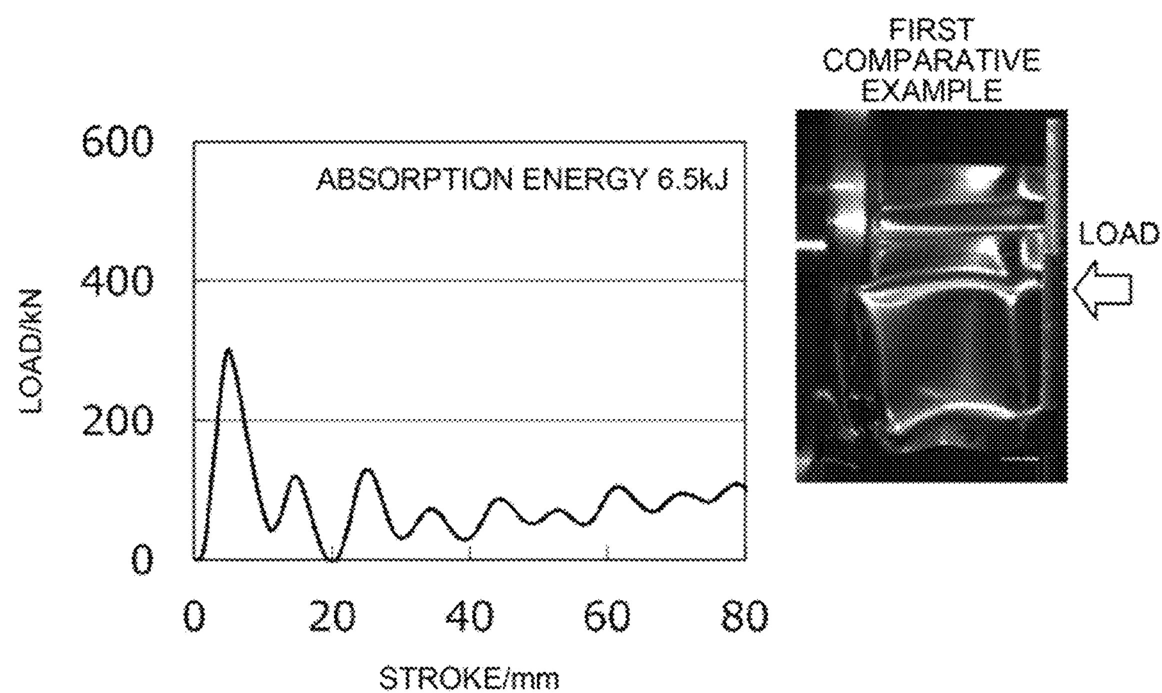
FIG. 17 is a view illustrating measurement results of crashworthiness load and stroke (amount of axial crushing deformation) and a deformation state of the test specimen according to the comparative example when axial crush tests of the test specimen were performed in the example (No. 1).

In the first comparative example illustrated in FIG. 17, the test specimen 41 (FIG. 16) in which the inner surface of the tubular member 3 was not coated with a resin was used. Load input to the test specimen 41 indicated the maximum value (about 300 kN) immediately after the start of input, and then the value of the load varied along with buckling deformation of the tubular member 3. At the end of the test when the stroke reached 80 mm, the upper part of the test specimen 41 repeatedly buckled as illustrated in FIG. 17. Absorption energy with strokes of 0 to 80 mm was 6.5 kJ.

Figure 18:
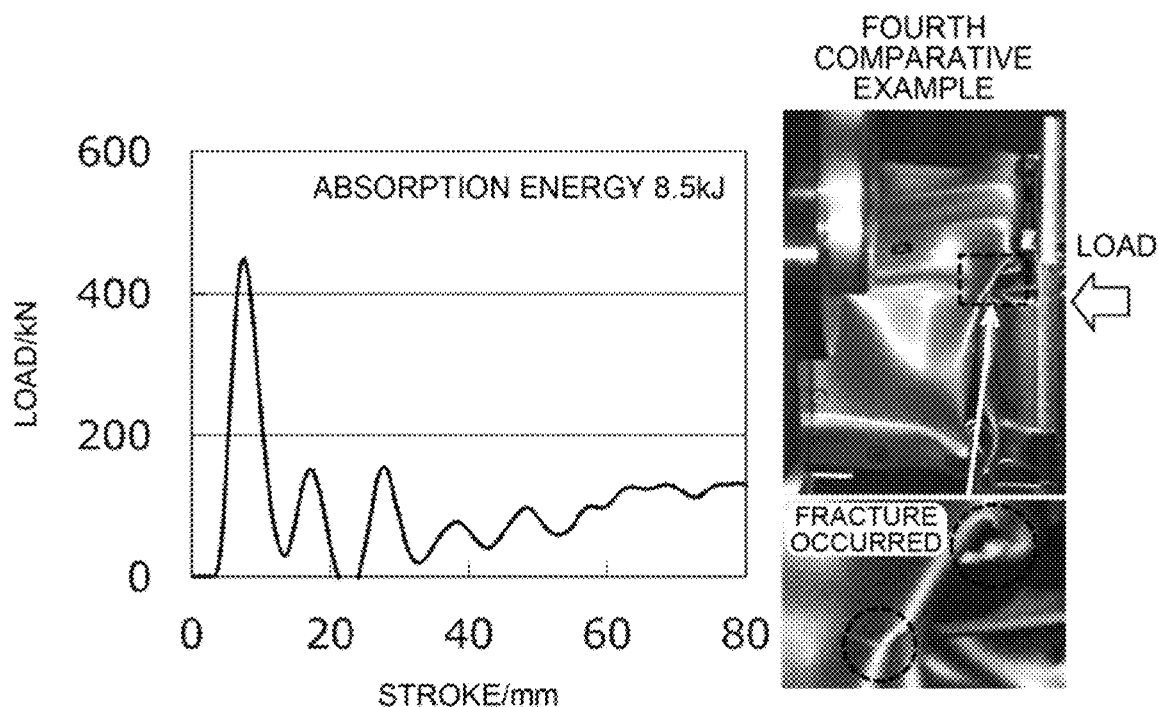
FIG. 18 is a view illustrating measurement results of crashworthiness load and stroke (amount of axial crushing deformation) and a deformation state of the test specimen according to the comparative example when axial crush tests of the test specimen were performed in the example (No. 2).

In the fourth comparative example illustrated in FIG. 18, the test specimen 41 (FIG. 16) in which the inner surface of the tubular member 3 was not coated with a resin was used similarly to the first comparative example, but the outer part 5 was a 1180 MPa class high-strength steel sheet. As compared with the first comparative example, it is understood that the increased strength of the steel sheet of the outer part 5 increases the maximum load immediately after the start of load input to about 450 kN and the buckling strength has increased. As a result, the absorption energy at strokes of 0 to 80 mm increased to 8.5 kJ. However, as illustrated in FIG. 18, a fracture occurred in the tubular member 3 during the test, and as a result, the value of the load after the stroke of 10 mm was almost the same as that in the first comparative example.

Figure 19:
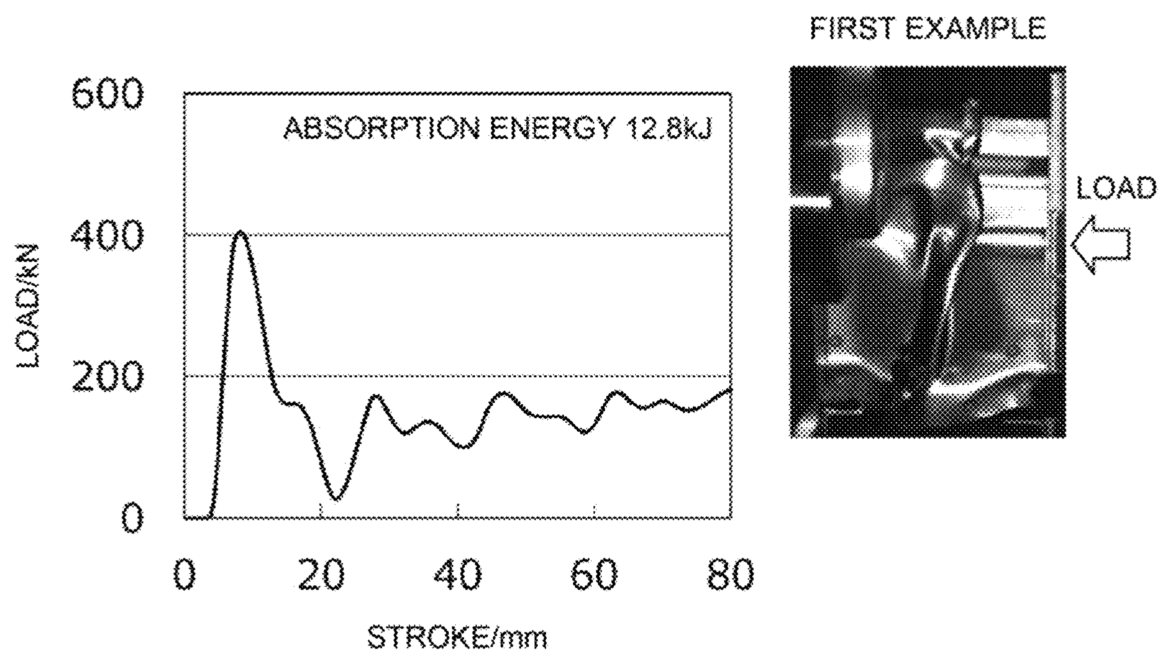
FIG. 19 is a view illustrating measurement results of crashworthiness load and stroke (amount of axial crushing deformation) and a deformation state of the test specimen according to the example of the present invention when axial crush tests of the test specimen were performed in the example (No. 1).

Example 1 illustrated in FIG. 19 used the test specimen 31 in which the release prevention member 23 was disposed to cover the resin 9 coating the inner surface of the outer part 5, and the adhesive strength between the resin 9, and the outer part 5 and the release prevention member 23 was 11.9 MPa within the range according to aspects of the present invention (10.0 MPa or more). In the load-stroke curve illustrated in FIG. 19, the maximum load immediately after the start of load input is 400 kN, which is almost the same as in the fourth comparative example in which a high-strength steel sheet of 1180 MPa class was used for the outer part 5, and the buckling strength increased. Furthermore, the outer part 5 and the inner part 7 did not break in the process of axial crush, but buckled and deformed in a bellows shape, and the deformation load after a stroke of 10 mm was stably higher than in the first comparative example and the fourth comparative example. As a result, the absorption energy at the stroke of 0 to 80 mm was 12.8 kJ, which was much higher than that in the first comparative example and the fourth comparative example.

In this manner, in the first example, it is understood that the buckling strength in the axial crushing process increased and the deformation resistance increased without the resin 9 stripped and released, resulting in bellows-shaped compressive deformation and improved crashworthiness energy absorption.

Figure 20:
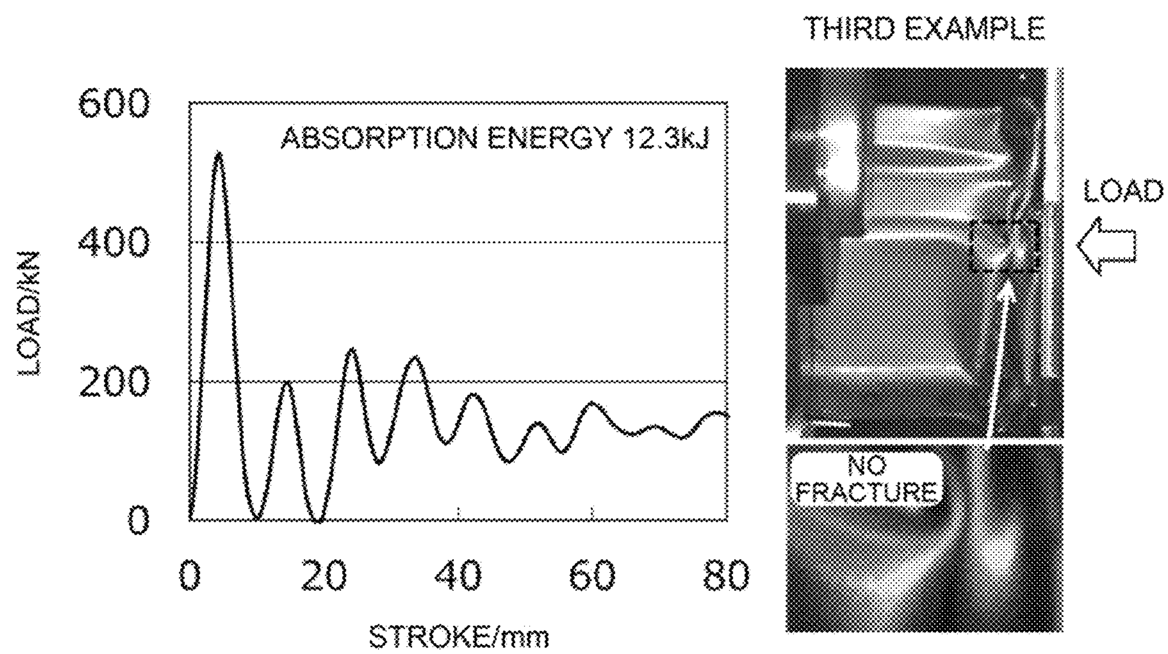
FIG. 20 is a view illustrating measurement results of crashworthiness load and stroke (amount of axial crushing deformation) and a deformation state of the test specimen according to the example of the present invention when axial crush tests of the test specimen were performed in the example (No. 2).

In the third example illustrated in FIG. 20, the test specimen 31 was used similarly to the first example, but the outer part 5 was a high-strength steel sheet of a 1180 MPa class. As compared with the first example, it is understood that the increased strength of the steel sheet of the outer part 5 increases the maximum load immediately after the start of load input to 500 kN or more, and the buckling strength has increased. Similarly to the first example, there was no fracture of the steel sheet in the axial crushing process. On the other hand, the value of the load after a stroke of 10 mm was almost the same as that in the first example. As a result, the absorption energy at the stroke of 0 to 80 mm was 12.3 kJ, which was satisfactory and equivalent to that in the first example.

Next, the structure and test specimen weight of the test specimens, as well as the results of the absorption energy when the axial crushing test was performed and the results of the character frequency obtained by the impact vibration test, are illustrated in Table 2 above. The test specimen weight illustrated in Table 2 is the sum of the weights of the outer part 5, the inner part 7, the release prevention member 23, and the resin 9 or the resin 17 for the test specimen 31 or the test specimen 33 coated with the resin 9 or the resin 17, and the sum of the weights of the outer part 5, the inner part 7, and the release prevention member 23 for the test specimen 41 coated or patched with no resin.

In the first comparative example, the test specimen 41 (FIG. 16) coated with no resin was used, and the test specimen weight was 1.06 kg. The absorption energy was 6.5 kJ as illustrated in FIG. 17 referred to above. Furthermore, the character frequency was 155 Hz.

In the second comparative example, in the test specimen 41 coated with no resin similarly to the first comparative example, the plate thickness of the outer part 5 was changed from 1.2 mm to 1.4 mm, and the test specimen weight was 1.17 kg. The absorption energy was 7.9 kJ, and the character frequency was 175 Hz.

The third comparative example used a test specimen 41 with the same shape as in the first comparative example, but the outer part 5 was made of 980 MPa class high-strength steel sheet, and the test specimen weight was 1.06 kg. The absorption energy was 8.1 kJ, which was an increase over the first comparative example, but a fracture occurred in the tubular member 3. The character frequency was 155 Hz.

The fourth comparative example used a test specimen 41 with the same shape as in the first comparative example, but the outer part 5 was made of 1180 MPa class high-strength steel sheet, and the test specimen weight was 1.07 kg. The absorption energy was 8.5 kJ, which was higher than in the third comparative example, but a fracture occurred in the tubular member 3. The character frequency was 155 Hz.

The fifth comparative example used a test specimen with the same shape as the test specimen 31 according to aspects of the present invention, but the resin 9 with a thickness of 1 mm was not cased to adhere to the outer part 5 and the release prevention member 23, and the adhesive strength was set to 0 MPa. The test specimen weight was 1.15 kg. Furthermore, the absorption energy was 8.7 kJ, and a fracture occurred in the tubular member 3. The character frequency was a low value of 255 Hz.

The sixth comparative example used a test specimen with the same shape as the test specimen 33 according to aspects of the present invention, in which the resin 17 with a thickness of 3 mm was coating only the punch shoulder R portion **5*b* of the outer part 5, but the adhesive strength between the resin 17 and the outer part 5 and the release prevention member 23 was 4.0 MPa outside the range of the present invention. The test specimen weight was 1.13 kg. Furthermore, the absorption energy was 7.6 kJ, and a fracture occurred in the tubular member 3**. The character frequency was as low as 285 Hz.

The seventh comparative example used a test specimen with the same shape as the test specimen 31 according to aspects of the present invention, but the adhesive strength between the resin 9 and the outer part 5 and the release prevention member 23 was set to 9.0 MPa outside the range of the present invention. The test specimen weight was 1.17 kg. Furthermore, the absorption energy was 8.3 kJ, and a fracture occurred in the tubular member 3. The character frequency was slightly low at 295 Hz.

The eighth comparative example used a test specimen with the same shape as the test specimen 35 according to aspects of the present invention, but the adhesive strength between the resin 9 and the outer part 5 was set to 4.0 MPa outside the range of the present invention. The test specimen weight was 0.96 kg. Furthermore, the absorption energy was 8.8 kJ, and a fracture occurred in the tubular member 3. The character frequency was as low as 265 Hz.

The ninth comparative example used a test specimen with the same shape as the test specimen 31 according to aspects of the present invention, but the thickness of the resin 9 was 9 mm outside the range of the present invention. The test specimen weight was 1.33 kg, and the absorption energy per unit weight was 6.6 kJ. The character frequency was as low as 275 Hz.

Figure 15:
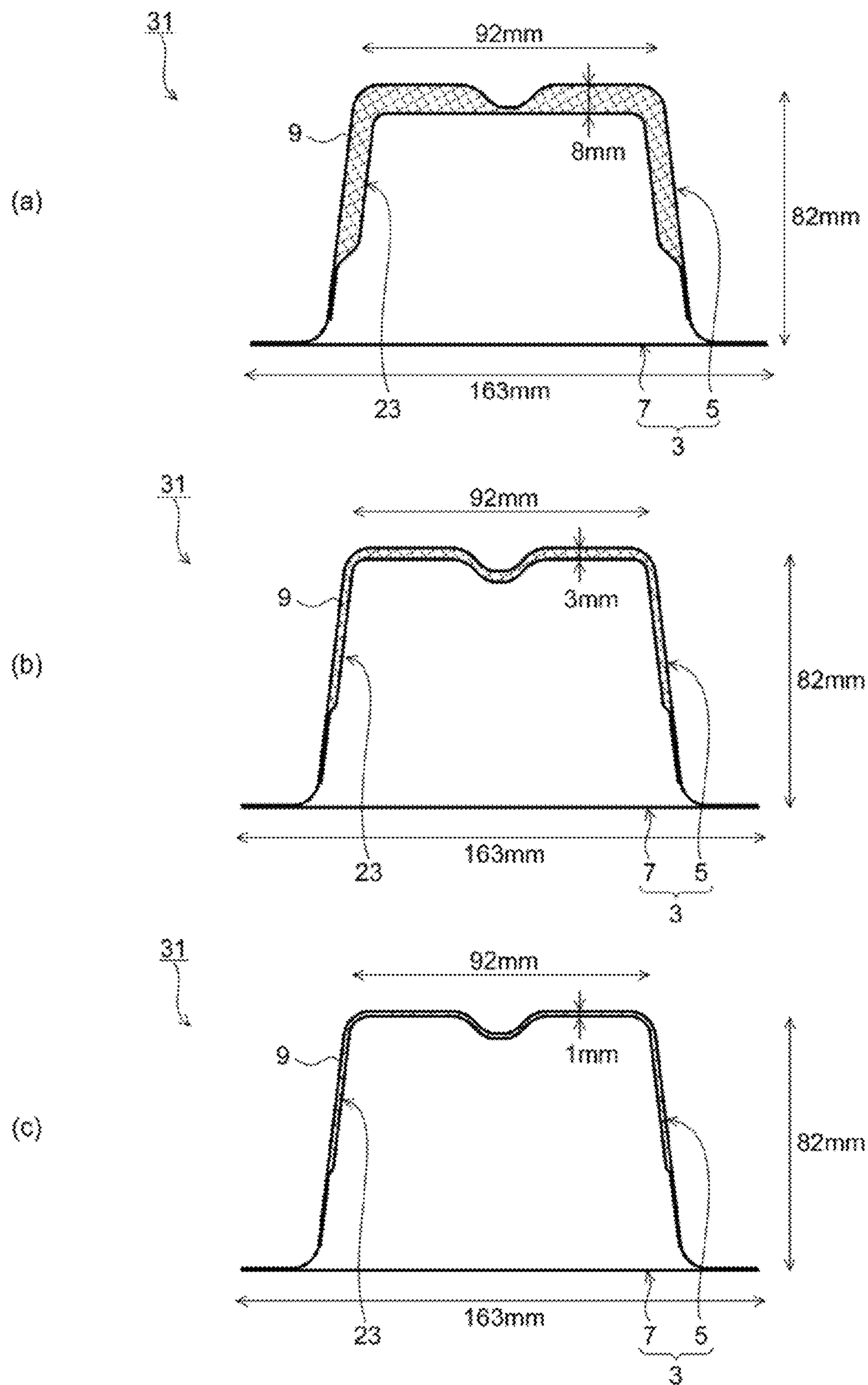
FIG. 15 is a view illustrating a structure of a test specimen used as an example of the present invention in the example (No. 4).

The first example used a test specimen 31 (FIG. 15(*a*)) in which the outer part 5 was a steel sheet with a strength of 590 Mpa class, the thickness of the resin 9 was 8 mm, and the adhesive strength was 11.9 MPa within the range according to aspects of the present invention (10.0 MPa or more). The test specimen weight in the first example was 1.28 kg, which was higher than the test specimen weight in the first comparative example (=1.06 kg) of the same material coated or patched with no resin. As illustrated in FIG. 19, the absorption energy in the first example was 12.8 kJ, which was much higher than the absorption energy of 6.5 kJ in the first comparative example (FIG. 17), and no fracture occurred in the tubular member 3. The absorption energy was significantly improved compared to the absorption energy (=8.6 kJ) in the fourth comparative example, in which the test specimen 41 in which the outer part 5 was a high-strength steel sheet of 1180 MPa class was used. Furthermore, the absorption energy per unit weight, which was calculated by dividing the absorption energy by the test specimen weight, was 10.0 kJ/kg, which was improved over the first comparative example (=6.1 kJ/kg) and the fourth comparative example (=7.9 kJ/kg). The character frequency in the first example was 450 Hz, which was much higher than that in the first comparative example (=155 Hz).

The second example is a test specimen 31 (FIG. 15(*c*)) in which the outer part 5 was a steel sheet with a strength of 590 MPa class and the thickness of the resin 9 was 1 mm. The absorption energy in the second example was 9.5 kJ, which was slightly lower than that in the first example, but much higher than the absorption energy in the first comparative example (=6.5 kJ), and no fracture occurred in the tubular member 3. Furthermore, the test specimen weight in the second example was 1.12 kg, which was lighter than the test specimen weight of 1.28 kg in the first example. Furthermore, the absorption energy per unit weight in the second example was 8.5 kJ/kg, which was higher than that in the first comparative example (=6.1 kJ/kg). The character frequency in the second example was 330 Hz, which was much higher than that in the first comparative example (=155 Hz).

In the third example, the outer part 5 was made of a high-strength steel sheet with a strength of 1180 MPa class in a test specimen 31 having the same shape as in the second example. The absorption energy in the third example was 12.3 kJ, which was slightly lower than that in the first example, but much higher than that in the first comparative example, and no fracture occurred in the tubular member 3. The test specimen weight in the third example was 1.15 kg, which was lighter than that of the first example. The absorption energy per unit weight in the third example was 10.7 kJ/kg, which was higher than that in the first example (=10.0 kJ/kg) and the first comparative example (=6.1 kJ/kg). In the fourth comparative example (FIG. 18), a fracture occurred in the tubular member 3 during the 50 mm axial crushing, but in the third example (FIG. 20), no fracture occurred in the tubular member 3. This is because the outer part 5 was coated with the resin 9 and the resin 9 is caused to adhere with an adhesive strength of 10 MPa or more, so that the bending radius of the buckling deformation of the bellows shape was not equal to or less than the fracture limit for bending radius. The character frequency in the third example was 330 Hz, which was significantly higher than that in the fourth comparative example (=155 Hz), where a steel sheet of the same material was used for the outer part 5 and no resin coating was used.

In the fourth example, the outer part 5 was a steel sheet with a strength of 590 MPa class, and a test specimen 33 with a resin 9 coating only the punch shoulder R portion 5*b* of the outer part 5 with a thickness of 3 mm was used. The absorption energy in the fourth example was 9.0 kJ, which was much higher than the absorption energy of 6.5 kJ in the first comparative example (FIG. 17). The test specimen weight in the fourth example was 1.12 kg, which was lighter than that in the first example. The absorption energy per unit weight in the fourth example was 8.0 kJ/kg, which was higher than that in the first comparative example (=6.1 kJ/kg), and no fracture occurred in the tubular member 3. The character frequency in the fourth example was 355 Hz, which was significantly higher than the character frequency of 285 Hz in the sixth comparative example, in which the adhesive strength of the resin 17 coating only the punch shoulder R portion 5*b* of the outer part 5 was outside the range of the present invention.

In the fifth example, the thickness of the resin 9 was set to 3 mm in a test specimen 31 of the same shape as in the first example (FIG. 15(*b*)). The absorption energy in the fifth example was 9.8 kJ, which was lower than that in the first example, but much higher than that in the first comparative example, and no fracture occurred in the tubular member 3. The test specimen weight in the fifth example was 1.16 kg, which was lighter than that in the first example. The absorption energy per unit weight in the fifth example was 8.4 kJ/kg, which was higher than the absorption energy per unit weight of 6.5 kJ/kg in the seventh comparative example, which used a test specimen 31 with an adhesive strength outside the range of the present invention (=9.0 MPa). The character frequency in the fifth example was 355 Hz, which was improved over the character frequency of 295 Hz in the seventh comparative example.

In the sixth example, a test specimen 35 with a resin 9 of 1 mm thickness coating the outer part 5 without a release prevention member was used, and the test specimen weight was 0.96 kg. The absorption energy in the sixth example was 11.2 kJ, and the absorption energy per unit weight was 11.7 kJ/kg. The energy absorptive properties were equivalent to or more than that in the first example, and no fracture occurred in the tubular member 3. The character frequency in the sixth example was 345 Hz, which was significantly higher than that in the eighth comparative example, in which the adhesive strength was outside the range of the present invention in the test specimen 35 of the same shape.

In the seventh example, the thickness of the resin 9 was set to 0.1 mm, which was the same level as that of a laminate in an ordinary laminated steel sheet, and the test specimen weight was 1.08 kg in a test specimen 31 of the same shape as in the first example. The absorption energy in the seventh example was 11.8 kJ, and the absorption energy per unit weight was 10.9 kJ/kg. The energy absorptive properties were equivalent to or more than that in the first example, and no fracture occurred in the tubular member 3. The character frequency in the seventh example was 300 Hz, which was significantly higher than that in the fifth comparative example, in which the resin 9 with a thickness of 1 mm was coating the outer part 5 in the test specimen 31 of the same shape, and the adhesive strength was outside the range of the present invention.

From the above, it was revealed that the automotive crashworthiness energy absorptive parts according to aspects of the present invention can efficiently improve the crashworthiness energy absorptive properties while minimizing the increase in weight when crashworthiness load is input in the axial direction and causes axial crushing, and can also improve the vibration-damping properties by increasing the character frequency when impact is applied.

The reason why the vibration-damping properties are improved by increasing the character frequency is as follows. When the character frequency of the tubular member 3, which is a crashworthiness member such as the front side member described above, enters the frequency range of the vibration of the engine mounted on the member, the tubular member 3 resonates (sympathetic vibration) and the vibration increases. For example, when the engine rotates at 4000 rpm, which is the high rpm range for normal driving, the crankshaft turns at the same rpm, and in a four-cycle engine, the crankshaft explodes and vibrates once every two revolutions, so the frequency of vibration is 133 Hz for a four-cylinder engine, 200 Hz for a six-cylinder engine, and 267 Hz for an eight-cylinder engine. Therefore, a character frequency of about 300 Hz or more in accordance with aspects of the present invention reliably prevents the above-mentioned sympathetic vibration and improve vibration-damping properties.

INDUSTRIAL APPLICABILITY

According to aspects of the present invention, the automotive crashworthiness energy absorptive part, which can improve crashworthiness energy absorptive effect by coating the inner surface with a resin and function as a damping material for absorbing vibration occurring in an automotive body, when crashworthiness load is input from the front side or the rear side of the automotive body such as a front side member or a crash box and causes axial crush, and the method for manufacturing the same can be provided.

REFERENCE SIGNS LIST

1 automotive crashworthiness energy absorptive part
3 tubular member
5 outer part
**5*a*** top portion
**5*b*** punch shoulder R portion
**5*c*** side wall portion
7 inner part
9 resin
11 automotive crashworthiness energy absorptive part
13 resin
15 automotive crashworthiness energy absorptive part
17 resin
21 automotive crashworthiness energy absorptive part
23 release prevention member
25 automotive crashworthiness energy absorptive part
27 resin
31 test specimen (example)
33 test specimen (example)
35 test specimen (example)
41 test specimen (comparative example)

The invention claimed is:

1. An automotive crashworthiness energy absorptive part to be provided at a front portion or a rear portion of an automotive body and configured to be axially crushed when crashworthiness load is input from a front side or a rear side of the automotive body to absorb crashworthiness energy, the automotive crashworthiness energy absorptive part comprising:

a tubular member configured to be axially crushed in a longitudinal direction of the tubular member to absorb crashworthiness energy by generating buckling deformation in a bellows shape, the tubular member having a top portion and side wall portions continuous to the top portion; and a resin configured to coat or patch at least inner surfaces of the top portion and the side wall portions of the tubular member, wherein the coated or patched resin has a thickness of 8 mm or less after being heated and forms at least a part of a peripheral wall portion in a closed cross-sectional space, and adheres to the inner surfaces with an adhesive strength of 10 MPa or more, the resin being an intervening object such that a bending radius of a convex bending portion of the buckling deformation in the bellows shape is made larger than a fracture limit for bending radius inherent of a metal sheet of the tubular member, and thereby fractures are prevented from occurring in the cove bending portion.

2. The automotive crashworthiness energy absorptive part according to claim 1, further comprising a release prevention member configured to cover a surface of the resin and join to the inner surface of the side wall portions, in order to prevent the resin from being released from the inner surface, wherein the resin adheres to the release prevention member with an adhesive strength of 10 MPa or more.

3. A method for manufacturing the automotive crashworthiness energy absorptive part according to claim 1, the method comprising:

coating or patching an inner surface of the metal sheet of the tubular member with the resin having the thickness of 8 mm or less; and adhering the resin to the inner surface of the tubular member with an adhesive strength of 10 MPa or more by performing heat treatment, under a predetermined condition, on the tubular member coated or patched with the resin.

4. A method for manufacturing the automotive crashworthiness energy absorptive part according to claim 2, the method comprising:

coating or patching the inner surface of the metal sheet of the tubular member with the resin having the thickness of 8 mm or less;

joining, to the inner surface of the side wall portions, the release prevention member for preventing the resin that is coating or patching the inner surface from being released from the inner surface, by disposing the release prevention member so as to cover the surface of the resin; and adhering the resin to the inner surface of the tubular member and to the release prevention member, with an adhesive strength of 10 MPa or more by performing heat treatment, under a predetermined condition, on the tubular member coated or patched with the resin.

5. A method for manufacturing the automotive crashworthiness energy absorptive part according to claim 2, the method comprising:

coating or patching a release prevention member with the resin having the thickness of 8 mm or less, the release prevention member being configured to prevent the resin from being released from the inner surfaces of the top portion of the tubular member and the side wall portions continuous to the top portion;

joining the release prevention member to the inner surface of the side wall portions by disposing the resin that is coating or patching the release prevention member such that the resin contacts the inner surface of the tubular member; and adhering the resin to the inner surface and to the release prevention member, with an adhesive strength of 10 MPa or more by performing heat treatment, under a predetermined condition, on the tubular member having the inner surface to which the release prevention member is joined.

* * * * *

UNITED STATES PATENT AND TRADEMARK OFFICE

CERTIFICATE OF CORRECTION

PATENT NO. : 11,993,311 B2
APPLICATION NO. : 17/299488
DATED : May 28, 2024
INVENTOR(S) : Kazuhiko Higai, Tsuyoshi Shiozaki and Yoshikiyo Tamai It is certified that error appears in the above-identified patent and that said Letters Patent is hereby corrected as shown below:

In the Claims

In Claim 1, Column 24, Line 5 delete “more,” and insert -- more, and --.

In Claim 1, Column 24, Line 11 delete “cove” and insert -- convex --.

Signed and Sealed this
Twenty-third Day of July, 2024

Katherine Kelly Vidal

Katherine Kelly Vidal
*Director of the United States Patent and Trademark Office*